(12) United States Patent
Tanaka et al.

(10) Patent No.: US 7,390,204 B2
(45) Date of Patent: Jun. 24, 2008

(54) CARD CONNECTOR WITH STATIONARY AND MOVABLE HOOKS

(75) Inventors: Hirohisa Tanaka, Tsu (JP); Toshihiro Yamamoto, Tsu (JP); Mitsuru Iida, Hisai (JP); Yoshihisa Inaba, Hisai (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/597,676

(22) PCT Filed: Aug. 17, 2005

(86) PCT No.: PCT/JP2005/015011

§ 371 (c)(1),
(2), (4) Date: Aug. 3, 2006

(87) PCT Pub. No.: WO2006/019115

PCT Pub. Date: Feb. 23, 2006

(65) Prior Publication Data

US 2007/0161274 A1    Jul. 12, 2007

(30) Foreign Application Priority Data

Aug. 18, 2004    (JP) .............................. 2004-238742

(51) Int. Cl.
*H01R 13/62* (2006.01)
(52) U.S. Cl. ...................................................... 439/159
(58) Field of Classification Search ................. 439/326, 439/630, 325, 159, 862, 331, 260; 235/492; 361/737
See application file for complete search history.

(56) References Cited

U.S. PATENT DOCUMENTS 6,383,027 B2 *    5/2002    Cabane et al. .............. 439/630

(Continued)

FOREIGN PATENT DOCUMENTS

JP              63-013496            1/1988

(Continued)

OTHER PUBLICATIONS

English Language Abstract of JP 11-176516.

(Continued)

*Primary Examiner*—Chandrika Prasad
(74) *Attorney, Agent, or Firm*—Greenblum & Bernstein, P.L.C.

(57) ABSTRACT

A compact and simple constitution of a card connector, with which attaching and detaching works of a card can be performed easily, is provided. The connector 1 comprises: a body 2 having a recess 2a for a card 100; six contact springs projecting from a bottom face 3a of the recess 2a on which the IC card 100 is disposed, and elastically contacting with contact terminals 101 of the card 100; a stationary hooking portion 20 provided on a rear face side of the body 2; a movable hooking member 5 provided on a front face side of the body 2, and movable in a anteroposterior direction of the body 2; and a plate spring 18 for charging the movable hooking member 5 toward the rear face of the body 2, and wherein a tapered face 5b is formed on a rear face side of a hooking portion 5c so as to come closer to the rear face of the body 2 as approaching to the bottom face 3a of the recess 2a. A front end of the IC card 100 is held between the stationary hooking member 20 and the bottom face 3a of the recess 2a, and a rear end of the IC card 100 is held by means of the hooking portion 5c provided on the rear face side of the movable hooking member 5 and the bottom face 3a of the recess 2a.

12 Claims, 11 Drawing Sheets

U.S. PATENT DOCUMENTS

| | | | |
|---|---|---|---|
| 6,561,431 B2 * | 5/2003 | Roussy et al. | 235/492 |
| 6,761,575 B2 * | 7/2004 | Bricaud et al. | 439/326 |
| 6,881,086 B2 * | 4/2005 | Ohashi | 439/326 |
| 6,896,548 B2 * | 5/2005 | Scuteri et al. | 439/541.5 |
| 7,182,618 B1 * | 2/2007 | Choy et al. | 439/328 |
| 2003/0022537 A1 * | 1/2003 | Bricaud et al. | 439/152 |
| 2005/0221649 A1 * | 10/2005 | Tanaka et al. | 439/159 |

FOREIGN PATENT DOCUMENTS

| | | |
|---|---|---|
| JP | 2860362 | 12/1998 |
| JP | 11-176516 | 7/1999 |
| JP | 11-238554 | 8/1999 |
| JP | 11-307191 | 11/1999 |
| JP | 3020020 | 1/2000 |
| JP | 2001-307027 | 11/2001 |
| JP | 2003-523610 | 8/2003 |
| JP | 2005-135305 | 5/2005 |
| WO | 91/15101 | 10/1991 |
| WO | 01/61790 | 8/2001 |

OTHER PUBLICATIONS

English Language Abstract of JP 2001-307027.
English Language Abstract of JP 11-307191.
English Language Abstract of JP 11-238554.
English Language Abstract of JP 2005-135305.
English Language Abstract of Corresponding JP 8-321353.

* cited by examiner

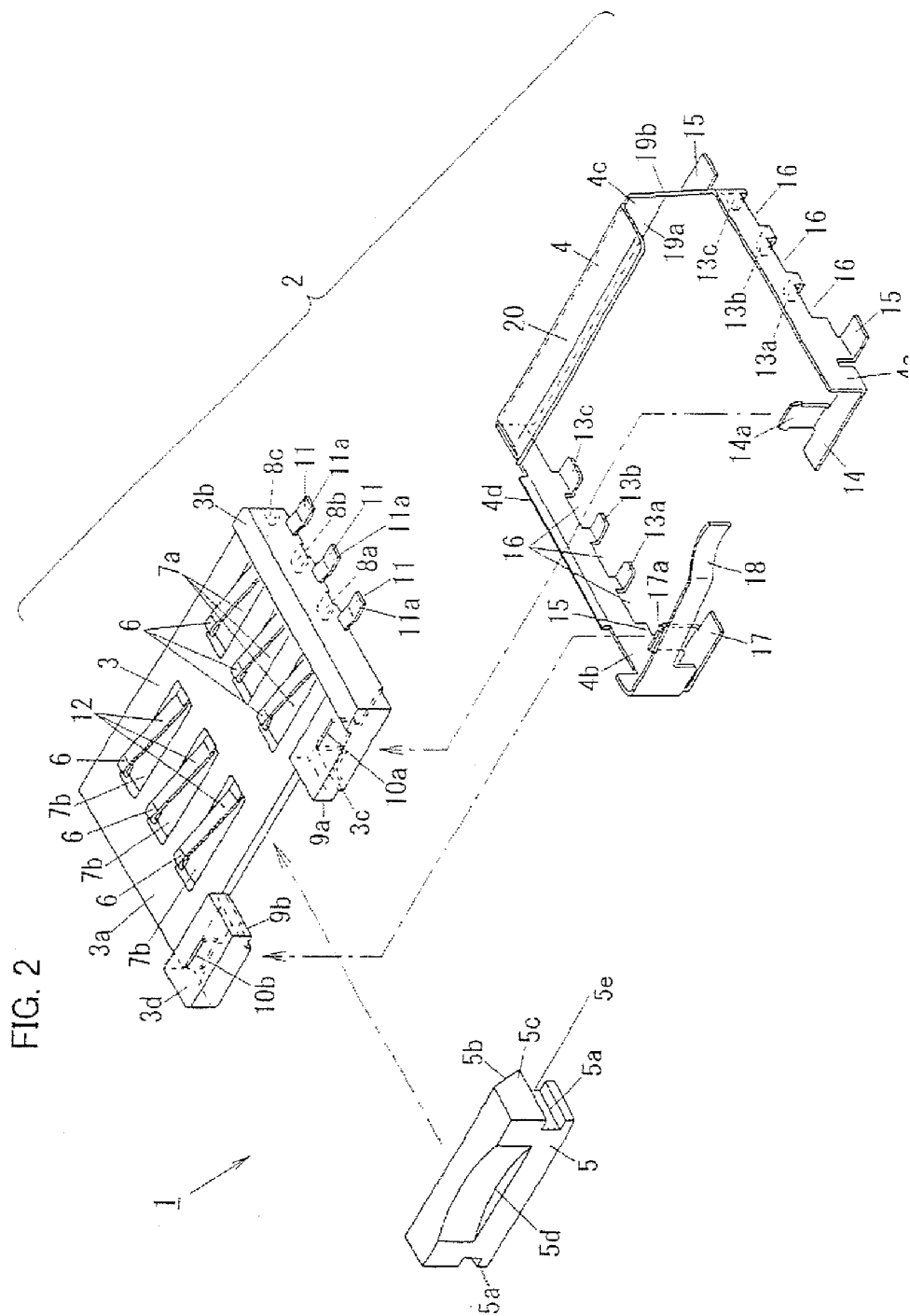

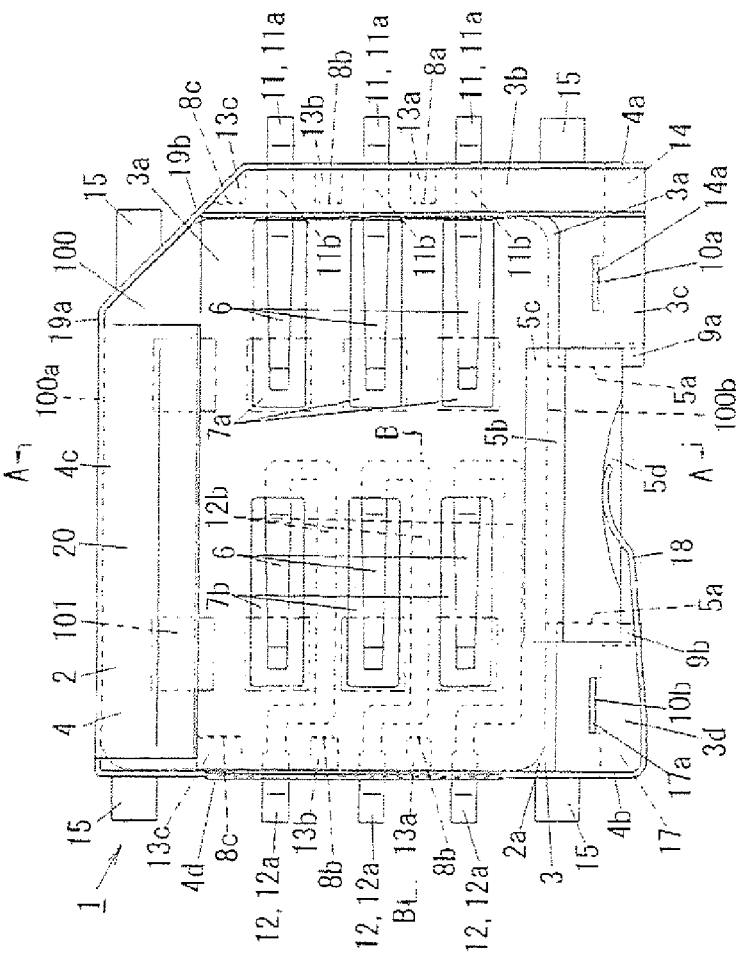
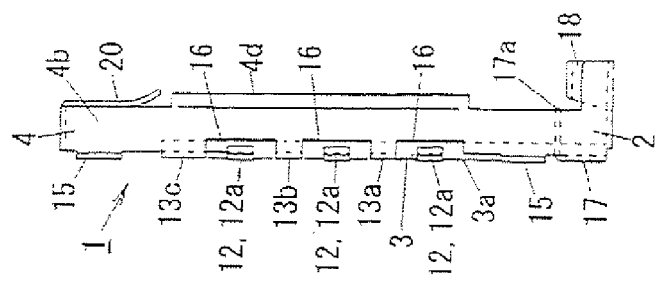

CARD CONNECTOR WITH STATIONARY AND MOVABLE HOOKS

TECHNICAL FIELD

The present invention relates to a card connector to connect a card such as an IC card or the like to an external circuit.

BACKGROUND ART

Conventionally, a card connector to connect an IC card which includes an IC chip composed of a memory, a CPU, or the like to an external circuit such as a printed circuit board or the like is provided.

According to Japanese Patent No. 2860362, a card connector, which comprises a body contiguously supporting an IC card and a cover rotatably attached to the body, is proposed.

As for this card connector, since the cover is rotatably attached to the body, the cover should be handled together with the body for mounting this connector on a printed circuit board or the like. Thus, it is difficult to mount this connector automatically on the printed circuit board or the like. Furthermore, as for this connector, the connection of the card and the connector is retained with directly contacting an end face of the card to an engagement face of the body. However, such a constitution cannot retain the connection between the card and the connector firmly. Therefore, it is necessary to provide a locking mechanism additionally to retain the connection for the purpose of ensuring the connection between the connector and the card certainly, thereby causing the complexity of the construction of the connector and upsizing the size of the connector.

On the contrary, according to Japanese Patent No. 3020020, a card connector comprising a body shaped in form of a flat rectangular plate, wherein six connecting terminals are mounted on its surface, and a cover which has a card receiving portion on its rear face and also doubles as a holder of a card which is slidably attached along the surface portion of the body is proposed.

As for this connector, the above mentioned problem with regard to the automatic attachment to the printed circuit board or the like is solved by means of a constituting that the body is separated from the cover when attaching the card. However, a de-installation of a component when attaching the connector causes a loss of the de-installed component. Furthermore, even this connector does not solve the problem of the complexity of the construction and the upsizing of the connector.

DISCLOSURE OF INVENTION

In order to solve the problem of the conventional art described above, an object of the present invention is to provide a compact card connector having a simple structure with which a card can be easily inserted and ejected.

A card connector in accordance with an aspect of the present invention comprises: a body comprising a recess into which a card, having a plurality of contact terminals disposed to be exposed on a surface thereof, is put; a plurality of contact springs projecting from a bottom face of the recess and contacting with respective contact terminals of a card elastically; a stationary hooking portion provided on a first face side (i.e., first side-face) of the body and holding a first end portion of the card with the bottom face of the recess; a movable hooking member provided on a second face side (i.e., second side-face) of the body, having a hooking portion on a side thereof facing the first face of the body, and being movable in a direction connecting the first face to the second face of the body; and a charging member for charging the movable hooking member toward the first face side of the body so as to hold a second end portion of the card between the hooking portion of the movable hooking member and the bottom face of the recess, wherein a face of the hooking portion facing the first face of the body is formed on a tapered face which comes closer to the first face side of the body as approaching to the bottom face of the recess.

According to such a constitution, the card can be contained and held in the recess with the stationary hooking portion and the movable hooking member provided on the body, so that an additional cover or a card holder becomes unnecessary, and thereby, a compact card connector having a simple structure can be obtained. Furthermore, an attaching and detaching operation of a card to the connector can be performed with moving it in a direction connecting the first face and the second face of the body of the movable hooking member, for example, in an anteroposterior direction, so that the attaching and detaching operation of the card becomes easier. Still furthermore, since the tapered face is formed on the movable hooking member, it is possible to move the movable hooking member toward the second face side against the charging force of the charging member with only pushing the tapered face with the second end portion of the card. When the second end portion of the card comes free from the tapered face of the movable hooking portion, the second end portion of the card is automatically held between the hooking portion of the movable hooking member and the bottom face of the recess, so that the card can be put in the connector with a one-touch operation. Still furthermore, when detaching the card, the card is lifted from the bottom face of the recess with an elastic force of the contact springs with moving the movable hooking member toward the second face side and thereby releasing the holding of the card between the hooking portion of the movable hooking member and the bottom face of the recess. Thus, the card can easily be taken out.

BRIEF DESCRIPTION OF DRAWINGS

FIG. 2 is an exploded perspective view showing a constitution of the connector in accordance with the first embodiment.

FIG. 3A is a plain view showing a constitution of the connector in accordance with the first embodiment, FIG. 3B is a front view of the connector, and FIG. 3C is a side view showing a state that a movable hooking member is omitted from the connector.

BEST MODE FOR CARRYING OUT THE INVENTION

First Embodiment

Figure 1A:
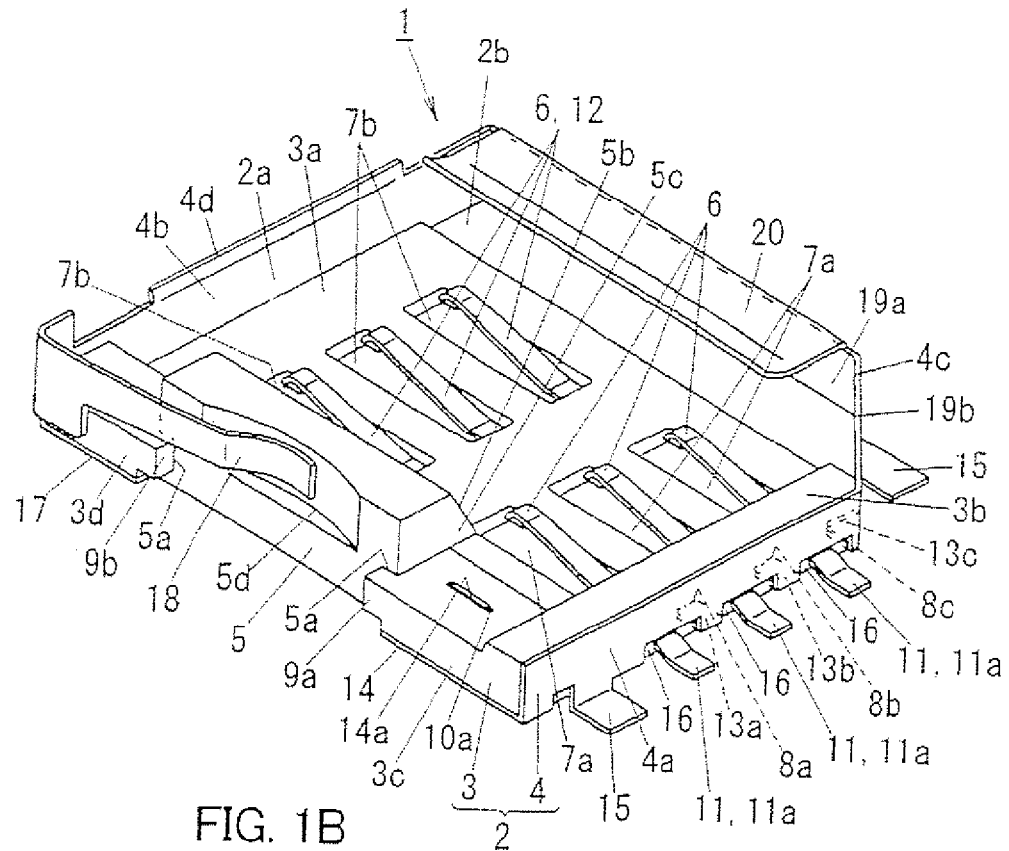
FIG. 1A is a perspective view showing a card connector (hereinafter, described simply as "the connector") in accordance with a first embodiment of the present invention.

A card connector (hereinafter, described simply as "the connector") 1 in accordance with a first embodiment of the present invention is described with reference to drawings. Besides, in each following embodiment, in FIG. 3A, for example, an upward direction is defined as a rear face (a first face) side or a backward of the connector 1, a downward direction is defined as a front face (a second face) side or a front of the connector 1, a leftward direction is defined as a left side of the connector 1, a rightward direction is defined as a right side of the connector 1, and a front side of the surface of the paper sheet is defined as an upward of the connector 1, for ease of description. Furthermore, in FIG. 3A, the upward direction is defined as a front end (a first end portion) of an IC card 100, the downward direction is defined as a rear end (a second end portion) of the IC card 100, the front side of the surface side of the drawing sheet is defined as a front face of the IC card 100, and a rear side of the surface of the paper sheet is defined as a rear face of the IC card 100. Still furthermore, although the IC card is described as an example in the descriptions of the following embodiments, the use of the present invention, however, is not limited to the IC card.

Figure 1B:
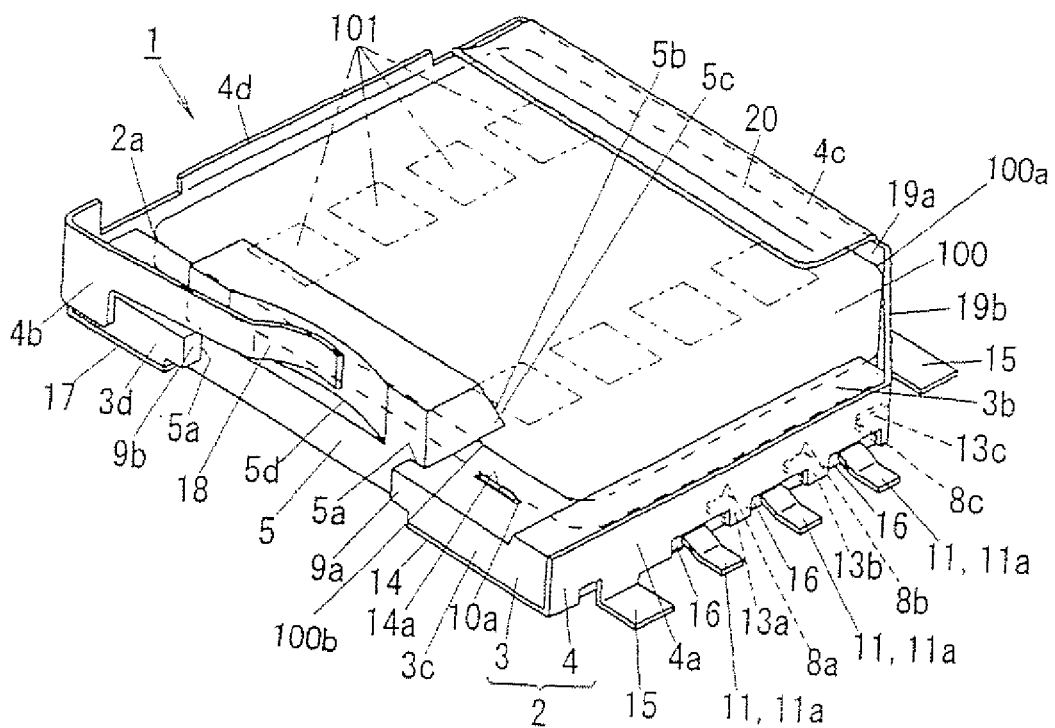
FIG. 1B is a perspective view showing a state that an IC card is put in the connector.

As shown in FIG. 1B, the IC card 100, in which eight contact terminals are provided to be exposed on its bottom face, is put in the connector 1 in accordance with the first embodiment. As for the IC card 100, a mini-UICC (USIM Integrated Circuit Card), for example, is used. A dimension of a conventional UICC is approximately 25 mm×15 mm, whereas the mini-UICC is a micro-mini IC card having a dimension of 15 mm×12 mm, approximately. Such an IC card 100 is formed in substantially a rectangular, hollow, and flat plate form with using a synthetic resin, for example, and it comprises a card body in which one corner between its long side and short side is cut off diagonally, an IC chip composed of a memory, a CPU and so on and also included in the card body, and contact terminals 101 for connecting the IC chip to an external circuit or the like. Each four contact terminals 101 arranged in parallel with a short side of a bottom face of the card body are further arranged in two rows along a long side.

As shown in FIG. 1A, the connector 1 is composed of an approximate rectangular parallelepiped body 2 alone which comprises a recess 2a into which the IC card 100 is contained, and no cover is provided thereto. As shown in FIG. 2, the body 2 is composed of three components of a base 3, a shell 4, and a movable hooking member 5. As shown in FIG. 1B, the IC card 100 is put into the connector 1 so that its bottom face faces a flat plate portion 3a of the base 3 which serves as a bottom face of the recess 2a of the body 2. Six contact springs 6, which elastically contact with six contact terminals 6 (SIC) other than two contact terminals 101 placed nearest to the front end side of the IC card 100 among the eight contact terminals 101 of the IC card 100, respectively, are provided on a flat plate portion 3a of the base 3 to project upward. Besides, in the following description, the same symbol 3a is used both in case of indicating the bottom face of the recess 2a and in case of indicating the flat plate portion of the base 3, if necessary.

Figure 4A:
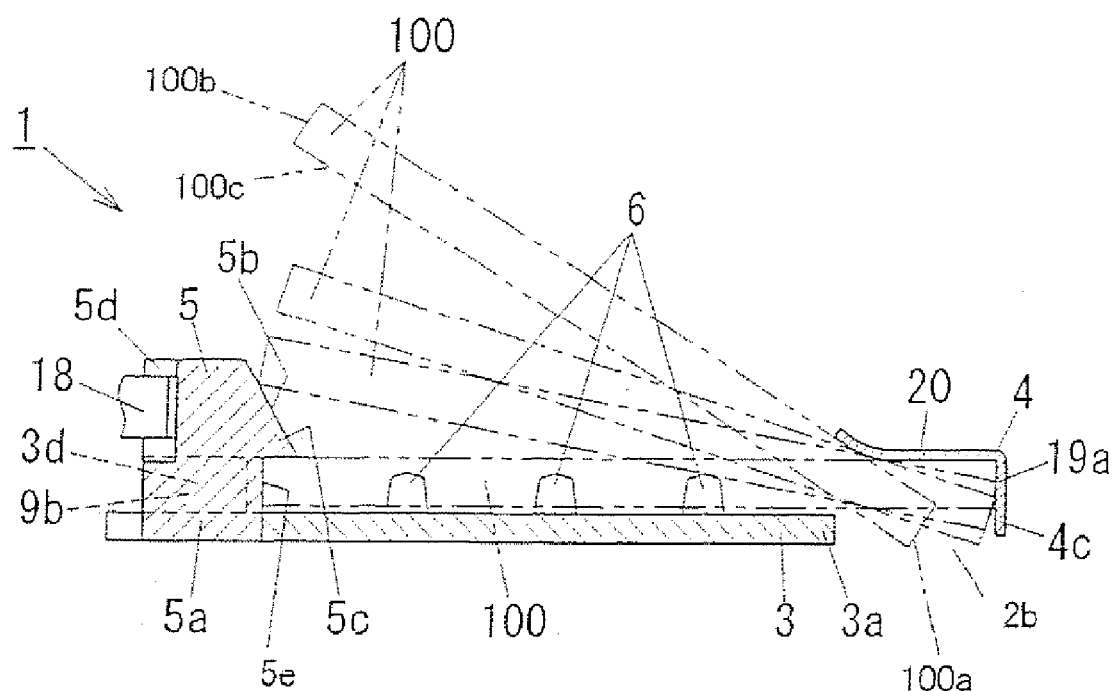
FIG. 4A is a cross-sectional view along a line A-A in FIG. 3A.

A stationary hooking portion 20 in form of a flat plate is provided on a rear face side of the body 2. Furthermore, the movable hooking member 5, which is provided movably in an anteroposterior direction of the connector 1, and a plate spring (charging member) 18, which presses the movable hooking member 5 toward the rear face side of the body 2, are provided in a front face side of the body 2. As shown in FIG. 4A, an end face 5e which is substantially perpendicular to the flat plate portion 3a of the base 3 and a hooking portion 5c which is formed to project above the flat plate portion 3a of the base 3 from an upper end of the end face 5e are formed in a rear face side of the movable hooking member 5. An inclined face 5b is formed on a rear face of the hooking portion 5c so that the IC card 100 can easily be inserted into the recess 2a.

Under a condition that the IC card 100 is put into the recess 2a of the body 2, a vicinity of a front end 100a of the IC card 100 is held between the stationary hooking portion 20 and the bottom face 3a of the recess 2a of the base 3. Furthermore, a vicinity of a rear end 100b of the IC card 100 is held between the hooking portion 5c of the movable hooking member 5 and the bottom face 3a of the recess 2a.

As shown in FIG. 2, the base 3 is formed of a synthetic resin with insert molding together with a first terminal member 11 and a second terminal member 12 each having the contact spring 6 integrally, and comprises a rectangular flat plate portion 3a which serves as the bottom face of the recess 2a of the body 2, a side wall portion 3b provided on a right end portion of the flat plate portion 3a, and press-fitted portions 3c and 3d formed on a front face side of the flat plate portion 3a and in both end portions of it in a longitudinal direction, respectively.

Three rectangular through holes 7a which are longer in the longitudinal direction are formed in parallel with the anteroposterior direction, at positions slightly nearer to a right side in relation to a center of the flat plate portion 3a in the longitudinal direction of the connector 1. Similarly, three rectangular through holes 7b which are longer in the longitudinal direction are formed in parallel with the anteroposterior direction, at positions slightly nearer to a left side in relation to the center of the flat plate portion 3a in the longitudinal direction of the connector 1. A contact spring 6 is disposed to be allowed for an elastic deformation in each of the through holes 7a and 7b. Furthermore, as shown in FIG. 3A, concave portions 8a, 8b and 8c which are used for connecting the base 3 and the shell 4 are formed on a rear face in both right and left end sides of the flat plate portion 3a. Besides, the concave portions 8a, 8b, and 8c are formed at positions shifted against the through holes 7a and 7b in the anteroposterior direction of the connector 1 so as not to overlap a line connecting the respective concave portions 8a, 8b and 8c on either side with a line connecting the respective through holes 7a and 7b disposed in parallel with the longitudinal direction.

The side wall portion 3b is formed in a substantially rectangular parallelepiped shape so that a thickness of it in a heightwise direction of the connector 1 becomes thicker than a thickness of the flat plate portion 3a. The side wall portion 3b is formed over a range from a front face side to a rear face side of the flat plate portion 3a along its right end, and an upper face of the side wall portion 3b is placed above an upper face of the flat plate portion 3a. Furthermore, a tapered face is formed on a corner portion of an upper end on a left side face (a face facing the flat plate portion 3a side) of the side wall portion 3b. This tapered face serves as a leading guide when putting the IC card 100 into the recess 2a.

The press-fitted portions 3c and 3d are formed in a substantially rectangular parallelepiped shape so that thicknesses of then in the heightwise direction of the connector 1 becomes thicker than the thickness of the flat plate portion 3a. Upper faces of the press-fitted portions 3c and 3d are placed above the upper face of the flat plate portion 3a, respectively. Furthermore, sliding ribs 9a and 9b for supporting the movable hooking member 5 slidably are respectively formed at upper ends of faces of the press-fitted portions 3c and 3d facing each other so as to project in the longitudinal direction. Still furthermore, press-fitting holes 10a and 10b used for fixing the shell 4 on the base 3 are respectively formed to protrude through from bottom faces to upper faces of the press-fitted portions 3c and 3d.

As shown in FIG. 3A, three first terminal members 11 arranged in the anteroposterior direction on a right side of the flat plate portion 3a of the base 3 and three second terminal portions 12 arranged in the anteroposterior direction on a left side of the flat plate portion 3a of the base 3 respectively have different shapes so that orientations of the contact springs 6 in respective through holes 7a and 7b face becomes the same.

Each first terminal member 11 is formed to be long plate of a conductive metal plate having elasticity, and comprises the above mentioned contact spring 6, a terminal 11a which is to be connected to an external circuit such as a printed board, and a connecting portion 11b which has a rectangular flat plate shape and connects a base end of the contact spring 6 with a base end of the terminal 11a integrally. These contact spring 6, the connecting portion 11b and the terminal 11a are arranged on a straight line from left side to right side of the connector 1. The contact spring 6 is inclined upward to the left side as extending from its face end to its front end portion, and the front end portion contacts with the contact terminal 101 of the IC card 100 elastically. On the contrary, the terminal 11a is inclined downward to the right side as extending from its face end to its front end portion.

The second terminal member 12 is formed of a conductive metal plate having elasticity, and comprises the above mentioned contact spring 6, a terminal 12a which is to be connected to an external circuit such as a printed board, and a connecting portion 12b which has a substantially U-shape of a flat plate for connecting a base end of the contact spring 6 with a base end of the terminal 12a integrally. The contact spring 6 is inclined upward to the left side as extending from its base end to its front end portion, and the front end portion contacts with the contact terminal 101 of the IC card 100 elastically. On the contrary, the each terminal 12a is inclined downward to the left side as extending from its base end to its front end portion. In this way, in the second terminal member 12, the contact spring 6 and the terminal 12a are formed to project in the same direction, so that the connecting portion 12b is formed to have a substantially U-shape with right angled corners to avoid the through hole 7b.

As described above, the first terminal member 11 and the second terminal member 12 are integrally provided with the base 3 through an insert molding. In other words, as shown in FIG. 3A, each first terminal member 11 is held on a molding die so as to project the contact spring 6 from a right side face of the through hole 7a to the left side and also to project the terminal 11a from a right side face of the side wall portion 3b of the base 3 to the right side. Furthermore, each second terminal member 12 is held on the molding die so as to project the contact spring 6 from a right medial face of the through hole 7b to the left side and also to project the terminal 12a from a left side face of the flat plate portion 3a of the base 3 to the left side. With inpouring an insulation synthetic resin into the molding die under such a state, the base 3 is molded, and the first terminal member 11, and simultaneously, the second terminal member 12 are held on the base 3 integrally.

Figure 4B:
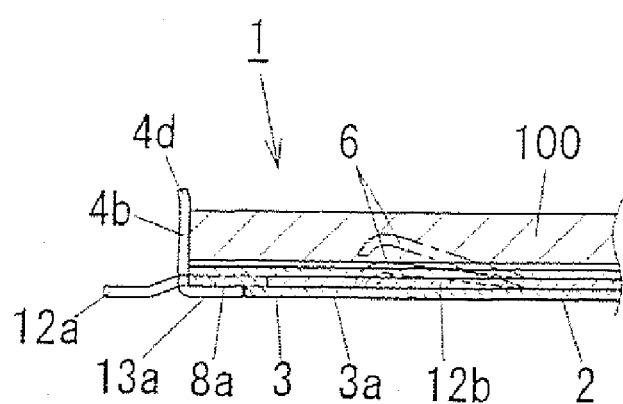
FIG. 4B is a partial cross-sectional view along a line B-B in FIG. 3A.

In the respective contact springs 6 of the first terminal member 11 and the second terminal member 12 comprised on the base 3 in this manner, as shown in FIGS. 4A and 4B respectively, their front end portions are placed above the flat plate portion 3a and also disposed inside the corresponding through holes 7a and 7b swingablly in an up-and-down direction.

The movable hooking member 5 is formed in a predetermined shape with using a synthetic resin. As shown, for example, in FIG. 2, a pair of grooves 5a which are slidably engaged with the sliding ribs 9a and 9b formed in the press-fitted portions 3c and 3d of the base 3 respectively, are formed so as to penetrate through in the anteroposterior direction on lower ends of both sides of the movable hooking member 5 in the longitudinal direction. Furthermore, a concave portion 5d hollowed in an arc shape is formed at an upper portion of a front face of the movable hooking portion 5. A front end portion of the plate spring 18 which is integrally formed with the shell 4 is contacted with this concave portion 5d, so that it receives a charging force toward the rear face from the plate spring 18. Still furthermore, as described above, the hooking portion 5c having the inclined face 5b is formed at an upper portion of the rear face of the movable hooking member 5 (refer to FIG. 4A).

As shown in FIG. 2, the shell 4 comprises a pair of a first side plate 4a and a second side plate 4b in parallel with each other, a stopper 4c connecting a base end of the first side plate 4a with a base end of the second side plate 4b integrally, and the plate spring 18 described above, and it is formed of metal plate having elasticity as a shape of a casing trim. The first side plate 4a of the shell 4 is formed to have a length substantially the same as that of the right side face of the side wall portion 3b of the base 3 in the anteroposterior direction. Supporting projections 13a and 13b to be engaged with the concave portions 8a and 8b on a right side of the flat plate portion 3a of the base 3, respectively, are formed so as to project to a left side on a lower end of a rear face side which serves as a base end of the first side plate 4a of the shell 4. Furthermore, an attachment portion 14 comprising a projecting portion 14a, which is to be press-fitted into the press-fitting hole 10a of the press-fitted portion 3c of the base 3, is formed so as to project to a left side on a lower end of a front face side which serves as a front end side of the first side plate 4a. Besides, the projecting portion 14a, as shown in FIGS. 2 and 3B, is formed so that a width of the front end portion thereof is wider than a width of the base end thereof, and also, both corners of the front end portion in the longitudinal direction are formed diagonally. Thus, the projecting portion 14a of the shell 4 is easy press-fitted into the press-fitting hole 10a, and also, the projecting portion 14a is hard to be pulled out from the press-fitting hole 10a.

Furthermore, a leg portion 15 is formed so as to project to a right side at a lower end between the attachment portion 14 on the front end of the first side plate 4a and the supporting projection 13a on a side nearer to the attachment portion 14. Still furthermore, notches 16 for preventing a short-circuit between the terminals 11a of each of the first terminal members 11 and the shell 4 are respectively formed at respective lower ends between the leg portion 15 of the first side plate 4a and the supporting projection 13a, between the supporting projection 13a and the supporting projection 13b, and between the supporting projection 13b and the face end.

As shown in FIGS. 3A to 3C, the second side plate 4b of the shell 4 is formed to be longer than the first side plate 4a, and also, its height is formed to be larger than a thickness of the flat plate portion 3a of the base 3. Supporting projections 13a, 13b, and 13c, which are to be engaged with the concave portions 8a, 8b, and 8c at a left end side of the flat plate portion 3a of the base 3, respectively, are formed so as to project to a right side at a lower end of the second side plate 4b. Furthermore, an attachment portion 17 comprising a projecting portion 17a, which is to be press-fitted into the press-fitting hole 10b of the press-fitted portion 3d of the base 3, is formed so as to project to a right side at a lower end of a front face which serves as an edge side of the second side plate 4b. In addition, similar to the projecting portion 14a of the attachment portion 14 in the first side plate 4a described above, the projecting portion 17a is formed so that a width of a front end portion thereof is formed to be wider than a width of a base end, and also, both corners of the front end portion in the longitudinal direction are formed diagonally. Thus, the projecting portion 17a of the shell 4 is easy to be press-fitted into the press-fitting hole 10b, and also, the projecting portion 17a is hard to be pulled out from the press-fitting hole 10b.

Furthermore, as shown in FIG. 3C, leg portions 15 are respectively formed so as to project to a left side at a lower end between the attachment portion 17 and the supporting projection 13a nearest to the attachment portion 17, and at a lower end of a face end of the second side plate 4b. Notches 16 are respectively formed for preventing a short-circuit between the terminals 12a of the second terminal members 12 and the shell 4 at lower ends between the leg portion 15 on an edge side of the second side plate 4b and the supporting projection 13a, between the supporting projection 13a and the supporting projection 13b, and between the supporting projection 13b and the supporting projection 13c. Still furthermore, a guide piece 4d of a flat plate shape, which is inclined toward a left side as extending to an upper side, is formed integrally at an upper end of the second side plate 4b. This guide piece 4d serves as a leading guide when inserting the IC card 100 into the recess 2a.

Figure 5A:
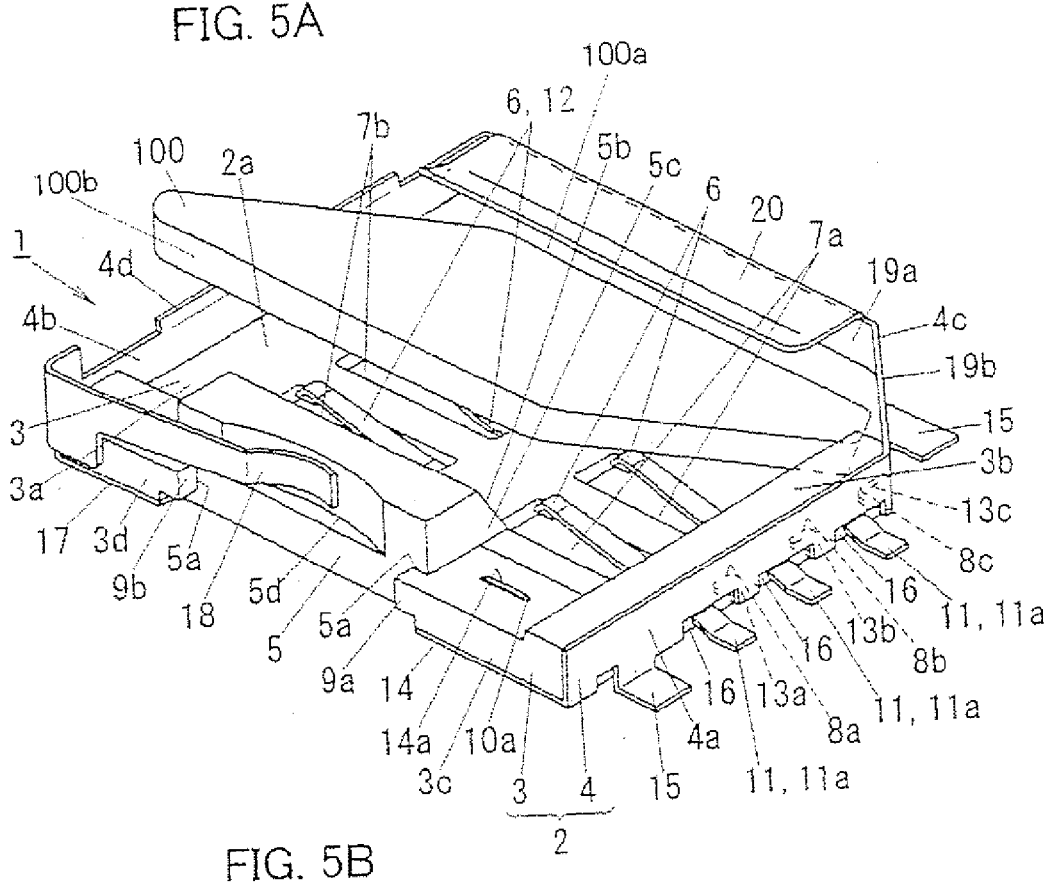
FIG. 5A is a perspective view showing a state of putting an IC card into the connector in accordance with the first embodiment.

The stopper 4c of the shell 4 is formed to contact with an end portion of the IC card 100, and it comprises a rear wall 19a which is formed to be bent at substantially a right angle from the base end of the second side plate 4b and is parallel to the longitudinal direction of the connector 1, and a connection wall 19b connecting a right end of the rear wall 19a with the base end of the first side plate 4a diagonally. The stationary hooking portion 20 of a flat plate shape is formed so as to project to a front face side at an upper end of the back wall 19a. When the IC card 100 is inserted into the recess of the body 2, the vicinity of the front end 100a of the IC card 100 is held between the stationary hooking portion 20 and the bottom face 3a of the recess 2a. In addition, a front end of the stationary hooking portion 20 is formed to be curved upward, as shown in FIG. 5A. Thereby, it becomes easy to insert the IC card 100 into a clearance between the stationary hooking portion 20 and the bottom face 3a of the recess 2a from its front end. Furthermore, at a lower end of the connection wall 19b, the leg portion 15 is formed so as to project to the right side, and the supporting projection 13c engaged with the concave portion 8c at the right end of the flat plate portion 3a is formed so as to project to the left side.

The plate spring 18 for pressing the movable hooking member 5 toward the rear face side of the body 2 is formed to be bent from an end of the second side plate 4b of the shell 4 toward a side of the first side plate 4a. As shown in FIG. 3A, the plate spring 18 is formed so as to come close to the rear face of the connector 1 as extending from its base end to front end thereof. In addition, the front end portion of the plate spring 18 is formed as an arc shape with curving toward the rear face side. Thereby, when bringing the front end portion of the plate spring 18 into contact with a side face of the concave portion 5d of the movable hooking member 5, the front end portion of the plate spring 18 can smoothly slide on the side face of the concave portion 5d.

Subsequently, an assembling procedure of the connector 1 composed of the base 3, the shell 4, and the movable hooking member 5 described above is described with reference to FIG. 2.

Firstly, the grooves 5a in the both side portions of the movable hooking portion 5 are slidably put into the sliding ribs 9a and 9b of the press-fitted portions 3c and 3d of the base 3, respectively so that the hooking portion 5c of the movable hooking member 5 is oriented toward the rear face side of the connector 1. Secondly, the shell 4 is connected to the base 3 from a lower side of the base 3. At that time, the terminals 11a projecting from the right side face of the base 3 respectively penetrate through the notches 16 on the first side plate 4a of the shell 4. Similarly, the terminals 12a projecting from the left side face of the base 3 respectively penetrate through the notches 16 on the second side plate 4b of the shell 4. The projecting portion 14a of the attachment portion 14 on a right side of the shell 4 and the projecting portion 17a of the attachment portion 17 on a left side of the shell 4 are press-fitted into the press-fitting holes 10a and 10b of the press-fitted portions 3c and 3d below, respectively. Furthermore, the concave portions 8a, 8b, and 8c in the right side portion of the base 3 are engaged with the supporting projections 13a and 13b in the first side plate 4a of the shell 4 and the supporting projection 13c in the connection wall 19b, respectively. Similarly, the concave portions 8a, 8b, and 8c in a left side portion of the base 3 are engaged with the supporting projections 13a, 13b, and 13c in the second side plate 4b, respectively.

Besides, as shown in FIGS. 1A and 1B, under a condition that the base 3 and the shell 4 are connected with each other, the front end portion of the plate spring 18 elastically contacts with the side face of the concave portion 5d in the movable hooking member 5. In other words, when connecting the base 3 with the shell 4, the plate spring 18 interferes spatially with the movable hooking member 5 which is put into the base 3 under natural conditions. Thus, it goes without saying that the plate spring 18 should be deformed slightly with being pulled to a front face side of the connector 1 so as to make the connection of the base 3 with the shell 4 east, when connecting the base 3 with the shell 4.

When the base 3 and the shell 4 are connected with each other, the movable hooking member 5 is pressed toward the rear face side of the connector 1 with the charging pressure of the plate spring 18, so that the lower end of the rear face side of the movable hooking member 5 contacts with the upper end of the front face side of the flat plate portion 3a, and also, the hooking portion 5c of the movable hooking member 5 is disposed at a position overlapping with the flat plate portion 3a on the upper side of the flat plate portion 3a of the base 3.

As described above, the lengths of the first side plate 4a and the second side plate 4b of the shell 4 are formed to be longer than the length of the base 3 in the anteroposterior direction. Thus, when connecting the base 3 with the shell 4, a predetermined clearance 2b is formed between the rear face side of the flat plate portion 3a of the base 3 and the stopper 4c of the shell 4, as shown in FIG. 1A, FIG. 4A, and so on. Therefore, when inserting the IC card 100 into the recess 2a of the body 2, this clearance 1a (SIC) can be used as a rotation space for the vicinity of the front end 100a of the IC card 100, as shown in FIGS. 4A and 5A. Thus, it is possible to prevent that the rotation of the front end portion of the IC card 100 is interrupted due to the vicinity of the front end 100a of the IC card 100 contacts with the bottom face 3a of the recess 2a of the body 2, and also, to take an insertion angle of the IC card 100 into the recess 2a of the body 2 wider. Consequently, the IC card 100 can easily be put into the connector 1. Furthermore, with forming such a clearance 2b for the rotation, it is possible to retain a sufficient length of the stationary hooking portion 20, so that the vicinity of the front end 100a of the IC card 100 is firmly held when putting the IC card 100 into the connector 1.

In the body 2 in the connector 1, the recess 2a for the IC card is formed with the flat plate portion 3a of the base 3 as a bottom face and with the side wall portion 3b, the press-fitted portions 3c and 3d, the second side plate 4b of the shell 4, and the stopper 4c as peripheral walls. A planar shape of this recess 2a of the body 2 is almost the same as a planar shape of the IC card 100, but is slightly larger in size corresponding to a dimension tolerance. Furthermore, the movable hooking member 5, which is under pressure from the plate spring 18 toward the rear face of the connector 1, presses the IC card 100, which is stored in the recess 2a of the body 2, toward the stopper 4. Thus, when the IC card 100 is contained in the recess 2a of the body 2, the stopper 4 contacts with the front end 100a of the IC card 100, and thereby the IC card 100 is positioned.

Furthermore, the guide piece 4d on the upper end of the second side plate 4b of the shell 4 is bent so as to project to an upper left, and still furthermore, the tapered face is formed on the left side face portion of the side wall portion 3b of the base 3. The guide piece 4d of the second side plate 4b and the tapered face of the side wall portion 3b serve as the leading guides in the longitudinal direction of the connector 1 when inserting the IC card 100 into the recess 2a of the body 2. Thus, when inserting the IC card into the recess 2a of the body 2, even though the position of the connector 1 is displaced in the longitudinal direction in some extent, the IC card 100 is guided to the correct location in relation to the recess 2a of the body 2 with these leading guides.

Similarly, the inclined face 5b projecting toward the rear face side from upper end to lower end thereof is formed on the upper portion of the rear face of the movable hooking member 5, and also, the front end of the stationary hooking portion 20 is formed to curve upward. These inclined face 5b of the movable hooking member 5 and the front end of the stationary hooking portion 20 serve as the leading guides in the anteroposterior direction of the connector 1 when inserting the IC card 100 into the recess 2a of the body 2. Thus, when inserting the IC card 100 into the recess 2a of the body 2, the insertion operation of the IC card 100 can be easily performed with inserting the front end of the IC card 100 with using these leading guides as an objective.

Figure 5B:
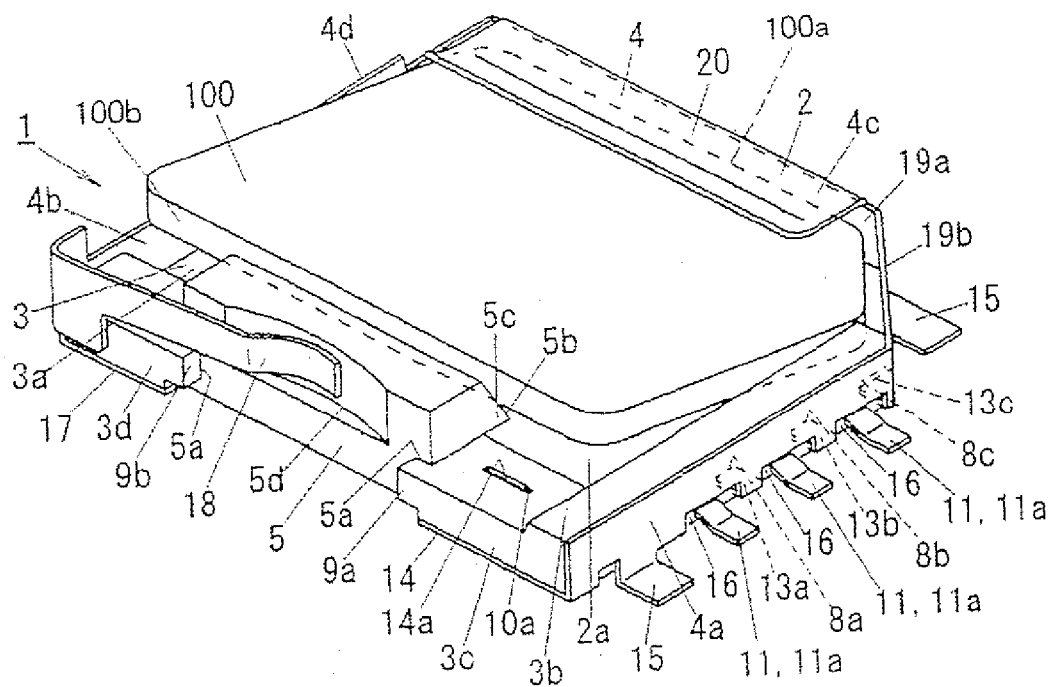
FIG. 5B is a perspective view showing another state of putting the IC card into the card connector.
Figure 6A:
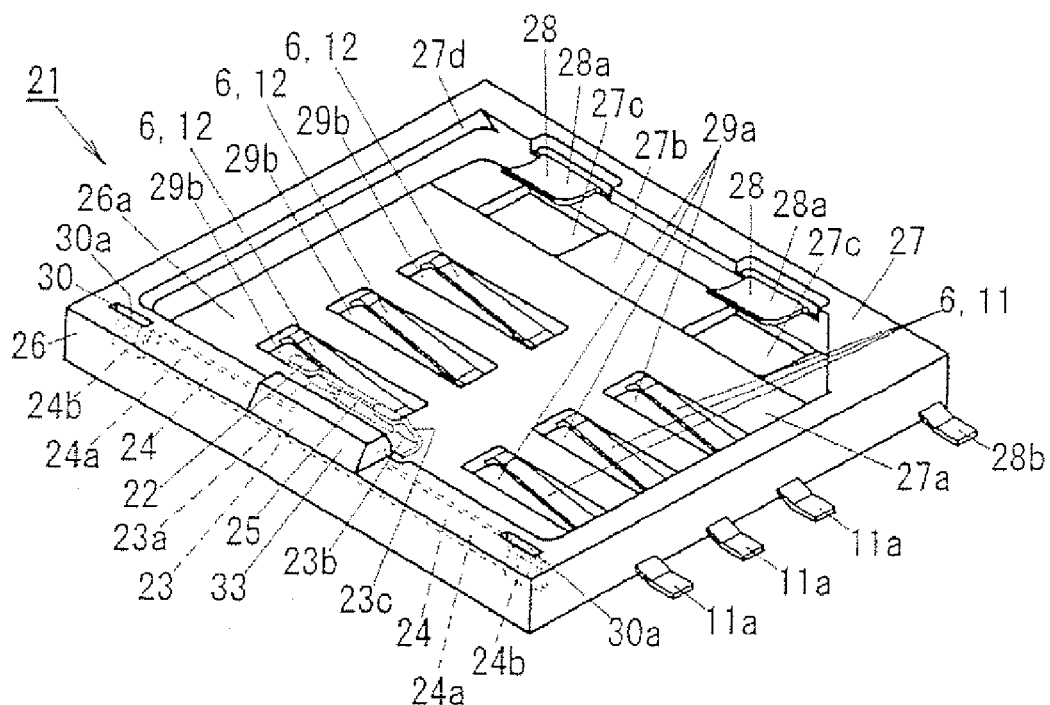
FIG. 6A is a perspective view showing a connector in accordance with a second embodiment of the present invention.
Figure 6B:
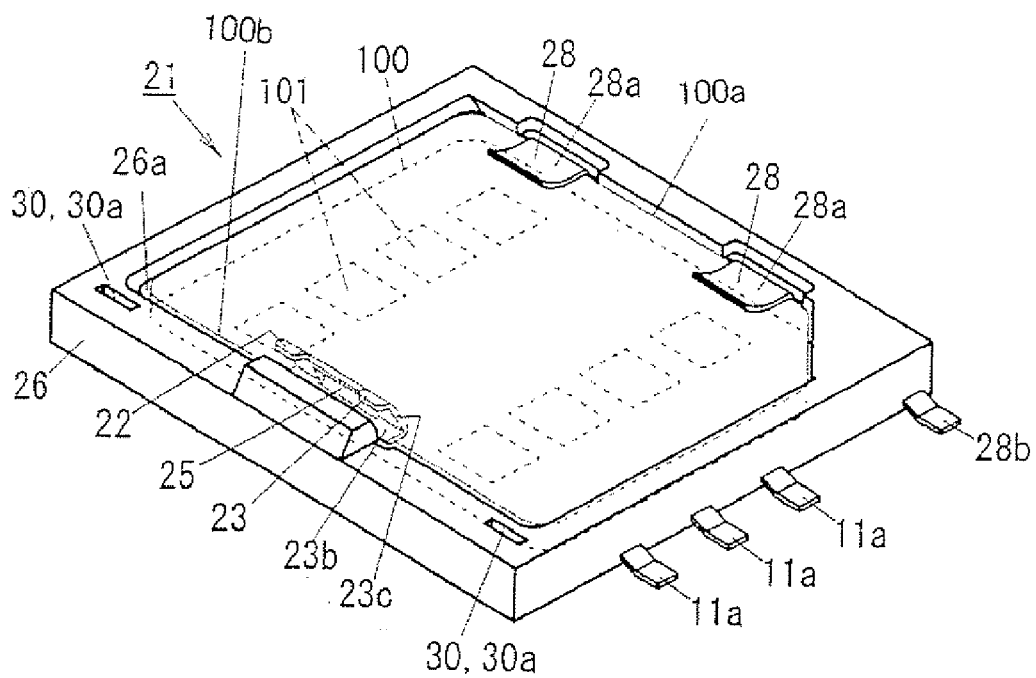
FIG. 6B is a perspective view showing a state that an IC card is put into the connector.

Subsequently, an operation of the connector 1 when putting the IC card 100 into the connector 1 is described with reference to FIGS. 4A, 5A, and 5B.

In order to put the IC card 100 into the connector 1, as shown in FIG. 5A, the front end 100a of the IC card 100 is downwardly inserted into a gap between the bottom face 3a of the recess 2a and the stationary hooking portion 20. Then, as shown in FIG. 4A, the front end of the IC card 100 goes into the clearance 1a (SIC) between the rear face side of the bottom face 3a of the recess 2a and the stopper 4c of the shell 4. In parallel with this, the rear end 100b of the IC card 100 is pressed downward. In that time, as shown by tow-dot chain lines in FIG. 4A, the vicinity of the front end of the IC card 100 rotates in the clearance 2b described above, and as shown in FIGS. 4A and 5B, the rear end 100b of the IC card 100 contacts with the inclined face 5b of the movable hooking member 5.

After contacting the rear end 100b of the IC card 100 with the inclined face 5b of the movable hooking member 5, when the rear end 100b of the IC card 100 is further pressed downward, the rear end 100b of the IC card 100 is relatively slid downward along the inclined face 5b of the movable hooking member 5. The movable hooking member 5 moves toward the front side of the connector 1 along the slide ribs 9a and 9b by an external force pressing the IC card 100 in against the charge of the plate spring 18. When the rear end 100b of the IC card 100 reaches a vicinity of a lower end of the inclined face 5b of the movable hooking member 5, the contact terminals 101, which are placed at positions nearest to the front end of the IC card 100 among the eight contact terminals 101 provided to be exposed from the bottom face 10c of the IC card 100, are exposed on the rear face side of the base 3 from the clearance 2b formed in the rear face side of the recess 2b, and the remained six contact terminals 101 contact with the contact springs 6 projecting toward the upper side from the bottom face 3a of the recess 2b.

When the rear end 100b of the IC card 100 is further pressed downward against the charging force of the plate spring 18 and the elasticity of the contact springs 6, the rear end 100b of the IC card 100 departs from the lower end of the inclined face 5b of the movable hooking portion 5, and then, it is located below the hooking portion 5c which overhangs above the bottom face 3a of the recess 2a. The movable hooking member 5 is moved to the rear face side of the connector 1 with the charging force of the plate spring 18, and thus, it is moved to a location where the hooking portion 5c overlaps with a surface of the vicinity of the rear end 100b of the IC card 100 in the heightwise direction of the connector 1. Consequently, the IC card 100 is contained in the recess 2a of the body 2, and thereby, put into the connector 1.

Although the IC card 100 contained in the recess 2a of the body 2 is tried to be floated from the flat plate portion 3a with the charging force of the respective contact springs 6, its movement in the heightwise direction of the connector 1 is blocked with the bottom face 3a of the recess 2a, the stationary hooking portion 20 and the hooking portion 5c of the movable hooking member 5, so that the IC card 100 is firmly put into the recess 2a without floating from the bottom face 3a of the recess 2a.

In order to detach the IC card 100 from the connector 1, the IC card 100 is lifted above the connector 1 with the elasticity of the contact springs 6 with moving the movable hooking member 5 toward the front face side of the connector 1 against the charging force of the plate spring 18 so as to release the holding of the rear end 100b of the IC card 100 between the hooking portion 5c and the bottom face 3a of the recess 2a. When a force applied to the movable hooking member 5 is released in such a state, the movable hooking member 5 returns to an initial position with the charging force of the plate spring 18, the rear end of the hooking portion 5c goes in below the bottom face 100c of the IC card 100, and the rear end 100b of the IC card 100 contacts with the inclined face 5b. Consequently, the IC card 100 can be easily detached from the connector 1.

As described above, according to the connector 1 of the first embodiment, the IC card 100 can be held in the recess 2a by means of the stationary hooking portion 20 and the movable hooking member 5 provided on the body 2, so that it is no need to provide any additional cover or a card holder, and thereby, a compact connector 1 having a simple structure can be obtained. Furthermore, the front end 100a of the IC card 100 with pushing the inclined face 5b by means of the rear end 100b of the IC card 100, and thereby, the IC card 100 can be put into the connector 1 with a one-touch operation. Still furthermore, in order to detach the IC card 100 from the connector 1, it is sufficient only to release the holding of the IC card 100 between the hooking portion 5c of the movable hooking member and the bottom face 3a of the recess 2a with moving the movable hooking member 5 toward the front of the connector 1, and thereby, the IC card 100 is automatically lifted from the bottom face 3a of the recess 2a with the elasticity of the contact spring 6, so that the IC card 100 can be easily detached from the connector 1. Still furthermore, the connector 1 can be composed of only three components, that is, the base 3, the shell 4, and the movable hooking member 5, so that a simplification of structure, an ease of assembly, and a cost reduction can be achieved with a reduction of a number of the components.

Second Embodiment

Subsequently, a card connector 1 (SIC) in accordance with a second embodiment of the present invention is described. In the first embodiment described above, the connector 1 is composed of only the body 2, and also, the body 2 is composed of only the three components, that is, the base 3, the shell 4, and the movable hooking member 5. However, in the connector 21 of the second embodiment, a number of components is further reduced, so that a body 26 is composed of only two components of a hooking clasp 22 and a base 27. Besides, as for the constitution similar to that of the first embodiment described above, the same symbols are provided, and then, the description of them is omitted.

Figure 7:
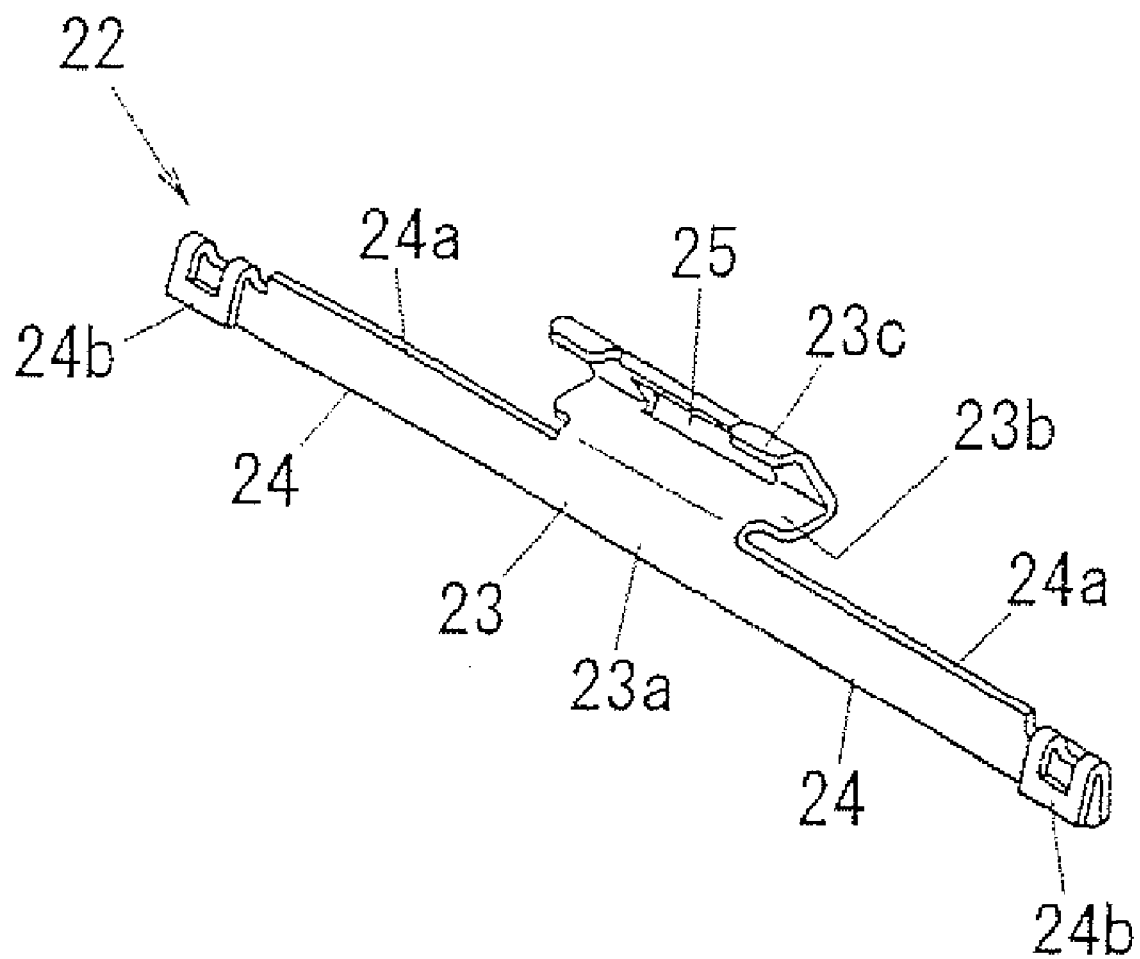
FIG. 7 is a perspective view showing a hooking clasp of the connector in accordance with the second embodiment.

As shown in FIG. 7, the hooking clasp 22 comprises a movable hooking member 23 and a pair of plate springs 24 integrally, and it is formed of a metal plate having elasticity. The hooking clasp 22 is bilaterally-symmetric with respect to the center of the movable hooking member 23, and long side portions 24a of the plate springs 24 are formed continuously on both sides of a base portion 23a of the movable hooking member 23, respectively. When seeing only the base portion 23a of the movable hooking member 23 and the respective long side portions 24a of the plate springs 24, it is a long and thin plate shaped member. A press-fitted portion 24b is formed at each end portion of the long side portion 24a of the plate spring 24 with bending a short side, which is formed perpendicular to the long side portion 24a and has a rectangular opening, toward a front side of the connector 1 into a reverse V-shape.

The movable hooking member 23 has a hooking portion 23b, which is formed so as to project from an upper end of the base portion 23a toward a rear face of the body 26, and an inclined side 23c, which is formed so as to incline to a front face side as extending upward from an end portion of a rear face side of the hooking portion 23b. Furthermore, a rectangular opening 25 is formed in a range from the hooking portion 23b to the inclined side 23c.

Figure 8A:
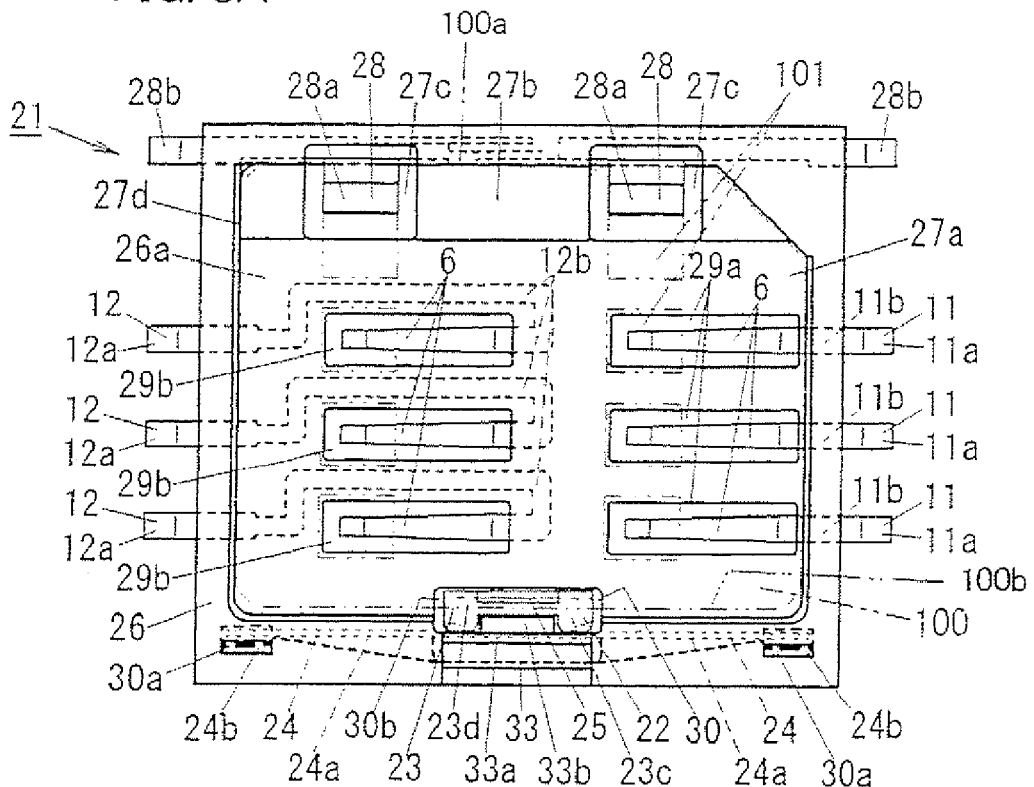
FIG. 8A is a plain view showing a constitution of the connector in accordance with the second embodiment.

As shown in FIG. 8A, the base 27 has a substantially rectangular parallelepiped box shape, which is formed with insert molding of a synthetic resin and has a recess 26a for the IC card 100 formed at substantially center portion thereof. Furthermore, three first terminal members 11, three second terminal members 12 and a pair of stationary hooking members 28 are integrally provided on the base 27. The stationary hooking members 28 are equivalent to the stationary hooking portion 20 in the first embodiment 1 described above.

The recess 26a of the base 27 has a shape almost the same as an outer shape of the IC card 100, but is formed slightly larger in size. An inner periphery surface on a rear face side of the recess 26a contacts with the front end of the IC card 100, and serves as a stopper for positioning the IC card 100. As shown in FIG. 8C, an inclined face 27b, which is inclined downward as extending to its rear face side, is formed on a rear face of a bottom face 27a of the recess 26a. When putting the IC card 100 into the recess 26a, a clearance for rotating the vicinity of the front end 100a of the IC card 100 is retained with the inclined face 27b. Furthermore, a rectangular opening 27c penetrating through a front face to a rear face of the base 27 is formed at each position of the inclined face 27b facing the stationary hooking member 28

Three rectangular through holes 29a which are longer in a longitudinal direction are formed in parallel in an anteroposterior direction at positions slightly nearer to a right side in relation to a center of the bottom face 27a of the recess 26a of the base 27. Similarly, three rectangular through holes 29b which are longer in the longitudinal direction are formed in parallel in the anteroposterior direction at positions slightly nearer to a left side in relation to the center of the bottom face 27a of the recess 26a. Contact springs 6 are respectively disposed in the through holes 29a and 29b so as to allow elastic deformation. Still furthermore, as shown in FIG. 8A, tapered faces 27d inclined toward the bottom face 27a are formed on end portions of an opening of the recess 26a in both sides in the longitudinal direction and a front face side of the base 27. These tapered faces 27d serve as leading guides when putting the IC card 100 into the recess 26a.

Figure 8B:
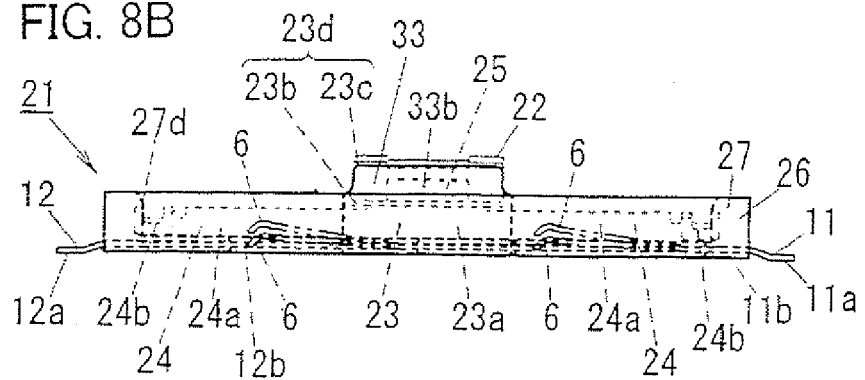
FIG. 8B is a front view of the connector.
Figure 8C:
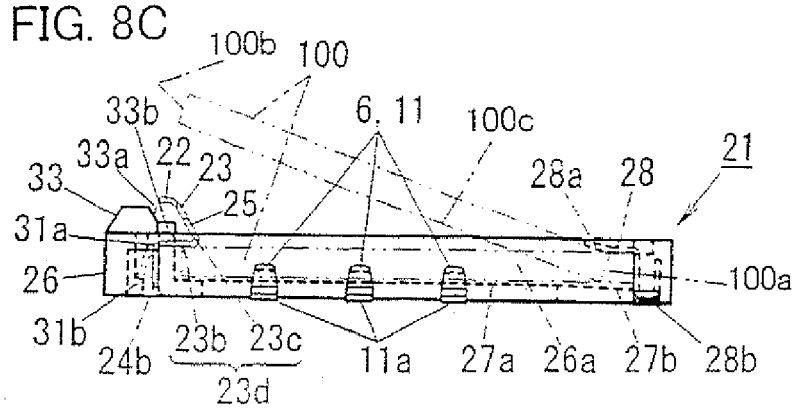
FIG. 8C is a right side view of the connector.

As shown in FIGS. 8A and 8B, a mounting hole 30, through which the hooking clasp 22 is mounted on the body 26, is formed in a lower portion of a front face side of the base 27. The mounting hole 30 has a pair of first hole portions 30a, into which the press-fitted portions 24b serving as base ends of the plate springs 24 are respectively press-fitted, formed in both end portions in the longitudinal direction, and a second hole portion 30b, which is formed between these first hole portions 30a, and, into which the respective long side portions 24a of the pair of the plate springs 24 and the movable hooking member 23 are inserted in a deformable form.

As shown in FIG. 8C, the first hole portion 30a has a rectangular cross-sectional shape penetrating through the base 27 from the front face to the rear face thereof. A first rib 31a, that a bended portion of the press-fitted portion 24b of the plate spring 24 is to be contacted with its lower face portion, is formed so as to project toward a front face in a vicinity of an upper end of an inner periphery surface on a rear face side of the connector 21 among inner periphery faces of the first hole portion 30a. Furthermore, a second rib 31b, that a front end portion of the press-fitted portion 24b of the plate spring 24 is to be contacted with an upper face portion thereof, is formed so as to project toward a rear face in a vicinity of a lower end of an inner periphery surface on a front face side of the connector 21 among the inner periphery faces of the first hole portion 30a. These first ribs 31a and second rib 31b serve as a retaining stopper of the hooking clasp 22.

As shown in FIG. 8A, the second hole portion 30b is communicated with the respective first hole portions 30a in both end portions of the base 27 in the longitudinal direction, its rear face side is formed to have a linear shape in parallel with the longitudinal direction, and its front face side is formed to have a circular arc shape. In other words, a width of the second hole portion 30b in the anteroposterior direction becomes the widest at a center portion of the base 27 in the longitudinal direction, and thereby, a space, which allows warp of the movable hooking member 23 of the hooking clasp 22 toward a front face side of the body 26, is retained. Furthermore, a center portion of the second hole portion 30b is opened over a range from the front face side of the base 27 to the bottom face 27a of the recess 26a so that the movable hooking member 23 projects upward the recess 26a.

In the front face side of the base 27, a rectangular protrusion 33 is formed integrally on an upper face portion of substantially a center portion of the base 27 in the longitudinal direction. A rear face 33a of the protrusion 33 is inclined toward a front face of the body 26 as extending from lower side to upper side thereof, similar to the inclined side 23c of the movable hooking member 23, and also, a rectangular retaining rib 33b, which enters into the opening 25 formed on the movable hooking member 23 when the movable hooking member 23 is dislocated forward, is formed to be protruded on the rear face 33a of the projecting portion 33.

As for the first terminal members 11 and the second terminal members 12, in the same manner as the case of the first embodiment described above, and As shown in FIG. 8A, each first terminal member 11 is held on a molding die so as to project the contact spring 6 from the right side face of the through hold 29a toward the left side and also to project the terminal 11a from the right side face of the base 27 toward the right side. Furthermore, each second terminal member 12 is held on the molding die so as to project the r contact springs 6 from an inner right face of the through hole 29b to the left side and also to project the terminal 12a from the left side face of the base 27 to the left side. With inpouring an insulation synthetic resin into the molding die in such a state, the base 27 is molded, and the first terminal members 11 and the second terminal members 12 are integrally held on the base 27, simultaneously.

In the respective contact springs 6 of the first terminal members 11 and the second terminal members 12 comprised on the base 27 by this means, as shown in FIGS. 8B and 8C respectively, the front end portions of them are placed above the bottom face 27a of the recess 26a, and also, disposed inside the corresponding through holes 29a and 29b swingablly in a heightwise direction.

The stationary hooking members 28 each are formed of a conductive metal plate having elasticity, and comprise a flat plate portion 28a for holding the front end 100a of the IC card 100 between the bottom face 27a of the recess 26a and it, and a terminal 28b of a long plate formed so as to project from a base portion of the flat plate portion 28a to a right side or a left side. A front end of the flat plate portion 28a, is formed to warped toward an upper side so that the IC card 100 can easily be inserted into the recess 26a, as shown in FIG. 8C.

As shown in FIG. 8A, when an insert molding by the synthetic resin is adopted to the base 27 as described above, the stationary hooking members 28 are held on the molding die so that each flat plate portion 28a projects from the rear face side to the front face side of the base 27 for overlapping with each opening 27a of the recess 26a in the heightwise direction, and also, each terminal 28b projects from the both right and left side faces of the base 27. While the base 27 is molded, the stationary hooking members 28 are also integrally held on the base 27, simultaneously.

As described above, in the connector 21 in accordance with the second embodiment, the body 26 is composed of two components, that is, the hooking clasp 22 and the base 27. The hooking clasp 22 is inserted into the mounting hole 30 below the base 27, and the movable hooking member 23 projects from a center portion of the second hole portion 30b toward the upper side of the recess 26a, and also, the press-fitted portions 24b of both the plate springs 24 are press-fitted into the first hole portions 30a, respectively. The hooking clasp 22 is fixed on the base 27 with contacting the bent portions of the press-fitted portion 24b of the plate spring 24 with a lower face portion of the first rib 31a of the first hole portion 30a. Thereby, the body 26 is completed.

When the hooking clasp 22 is mounted on the base 27, the press-fitted portions 24b, which are warped when press-fitted in, recover their original shapes, and the front end portions of the press-fitted portions 24b contact with an upper face of the second rib 31b. Thus, it is possible to prevent that the hooking clasp 22 comes off from the base 27. Furthermore, the IC card 100 receives the charging forces due to the elasticity of the contact springs 6 upwardly, under a condition that the IC card 100 is held between the flat plate portion 28a of the stationary hooking member 28 and the bottom face 27a of the recess 26a. However, as shown in FIG. 8C, since the retaining rib 33b provided on the protrusion 33 contacts with the upper face portion of the hooking portion 23b of the hooking clasp 22, the hooking portion 23b of the movable hooking member 23 may not be warped toward the upper side, so that deformation of the hooking portion 23b can be prevented.

Subsequently, an operation of the connector 21 when putting the IC card 100 into the connector 21 is described.

Figure 9:
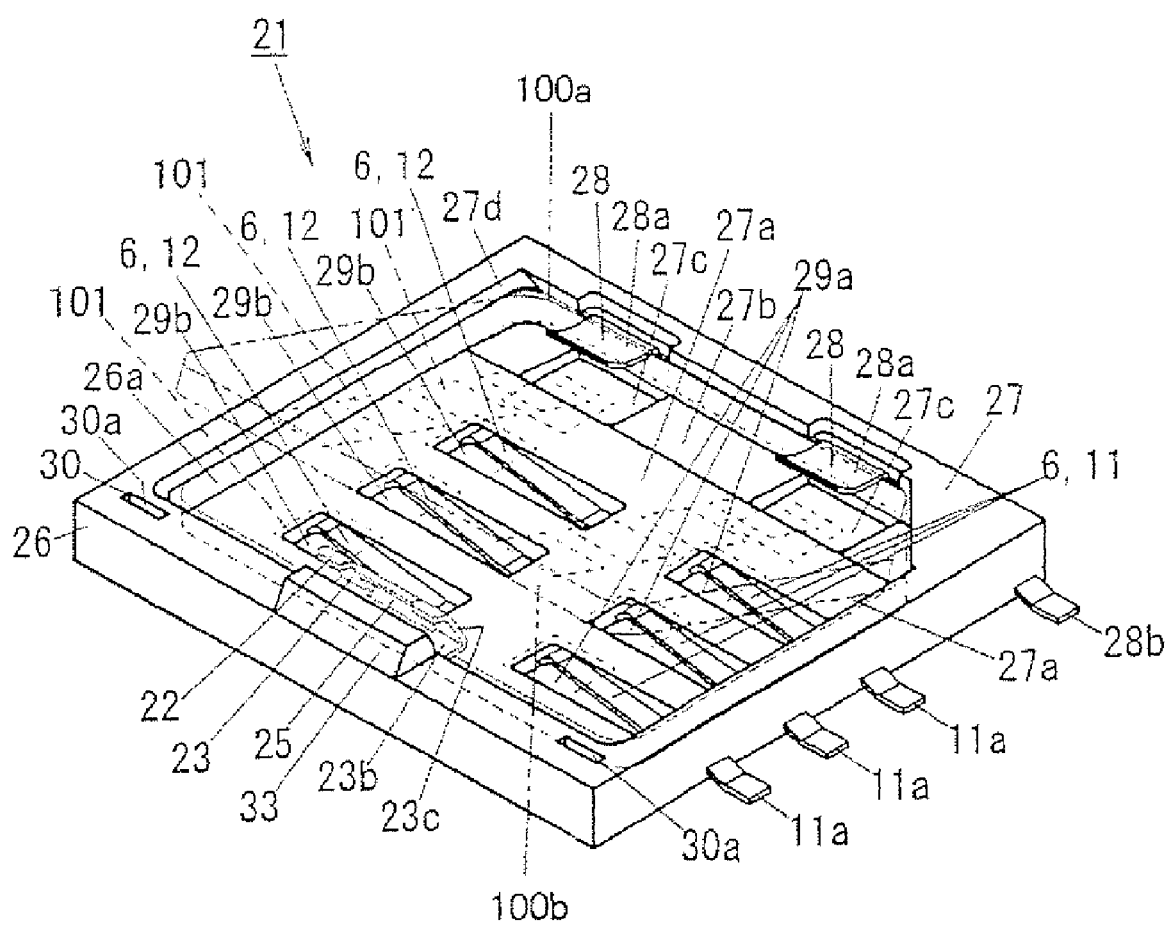
FIG. 9 is a perspective view showing an assumed state of that an IC card is put into the connector in accordance with the second embodiment observed through the IC card.

Firstly, as shown in FIG. 9, the front end 100a of the IC card 100 is inserted between the stationary hooking member 28 and the bottom face 27a of the recess 26a with directing the front end 100a of the IC card 100 downward. Secondly, the rear end 100b of the IC card 100 is pressed downward. As described above, the tapered faces 27d formed on the base 27 serve as leading guides when putting the IC card 100 into the recess 26a. Since the inclined face 27b is formed on the rear face side of the bottom face 27a of the recess 26a as described above, the clearance for rotating the vicinity of the front end 100a of the IC card 100 when putting the IC card 100 into the recess 26a is retained with the inclined face 27b. Thus, when the rear end 100b of the IC card 100 is pressed downward, the vicinity of the front end 100a of the IC card 100 can smoothly be rotated in this clearance, so that interruption of rotation or movement of the IC card 100 due to contacting the front end 100a of the IC card 100 with the bottom face 27a of the recess 26a may not occur. Consequently, the IC card 100 can easily be put into the recess 26a.

When pressing the IC card 100 in, then a lower end of the rear end 100b of the IC card 100 will contact with the inclined side 23c of the movable hooking member 23. After contacting the rear end 100b of the IC card 100 with the inclined side 23c of the movable hooking member 23, when the rear end 100b of the IC card 100 is further pressed downward, the rear end 100b of the IC card 100 is relatively slid downward along the inclined side 23c of the movable hooking member 23. The movable hooking member 23 moves toward the front of the connector 21 with the external force for pressing the IC card 100 in against the charging force of the plate spring 24.

When the rear end 100b of the IC card 100 reaches to a vicinity of a lower end of the inclined side 23c of the movable hooking member 23, the contact terminals 101 placed at positions nearest to the front end of the IC card 100 among the eight contact terminals 101 provided to be exposed from the bottom face 100c of the IC card 100 are exposed on the rear face side of the base 27 from the opening 27c formed on the inclined face 27b of the recess 26b, and the remained six contact terminals 101 contact with the contact springs 6 projecting toward the upper side from the bottom face 27a of the recess 26b of the base 27. At this time, the retaining rib 33b for preventing the deformation of the hooking portion 23b penetrates through the opening 25 formed on the movable hooking member 23, so that it does not interfere in the movement of the movable hooking member 23.

When the rear end 100b of the IC card 100 is further pressed downward against the charging force of the plate spring 24 and the elasticity of the contact springs 6, the rear end 100b of the IC card 100 departs from the lower end of the inclined side 23c of the movable hooking member 23 and then located below the hooking portion 23c. The movable hooking member 23 is moved toward the rear face side of the connector 21 with the charging force of the plate spring 24, and the hooking portion 23c is moved to a position overlapping with the surface of the vicinity of the rear end 100b of the IC card 100 in the heightwise direction of the connector 21. Consequently the IC card 100 is stored in the recess 26a of the base 27 and then put into the connector 21.

Although the IC card 100 contained in the recess 26a of the base 27 is tried to be floated from the bottom face 27a of the recess 26a due to the charging force of the respective contact springs 6, the movement of the connector 21 in the heightwise direction, however, is blocked with the bottom face 27a of the recess 26a, the stationary hooking members 28 and the hooking portion 23b of the movable hooking member 23, so that the IC card 100 is firmly put in the recess 26a without floating from the bottom face 27a of the recess 26a.

In order to detach the IC card 100 from the connector 1 (SIC), the IC card 100 is lifted above the connector 21 with the elastic force of the contact springs 6 with moving the movable hooking member 23 toward the front face side of the connector 21 against the charging force of the plate spring 24 and releasing the holding condition of the rear end 100b of the IC card 100 between the hooking portion 23b of the movable hooking member 23 and the bottom face 27a of the recess 26a. When a force applied to the movable hooking member 23 is released in such a state, the movable hooking member 23 returns to an initial position with the charging force of the plate spring 24, the rear end of the hooking portion 23b goes in below the bottom face 100c of the IC card 100, and the rear end 100b of the IC card 100 contacts with the inclined side 23c. Consequently, the IC card 100 can easily be detached from the connector 1 (SIC).

As described above, according to the connector 1 (SIC) of the second embodiment, in the same manner as the case of the first embodiment, the IC card 100 can be held in the recess 26a by means of the stationary hooking members 28 and the movable hooking member 23 provided on the body 26, so that it is no need to use any additional cover or card holder, and thereby, a compact connector 21 having a simple structure can be obtained. Furthermore, with pushing the inclined side 23c of the movable hooking member 23 by means of the rear end 100b of the IC card 100, the movable hooking member 23 can be moved against the charging force of the plate spring 24, and thereby, the IC card 100 can be put into the connector 21 with a one-touch operation. Still furthermore, in order to detach the IC card 100 from the connector 21, it is sufficient to move the movable hooking member 23 toward the front of the connector 21 and the holding of the IC card 100 between the hooking portion 23b of the movable hooking member 23 and the bottom face 27a of the recess 26a is released, and thereby, the IC card 100 is automatically lifted from the bottom face 27a of the recess 26a with the elastic forces of the contact springs 6, so that the IC card 100 can easily be detached from the connector 21. Still furthermore, since the connector 21 can simply be composed of two components, that is, the base 27 and hooking clasp 22 comprising the movable hooking member 23, it is possible to achieve simplification of structure and cost reduction due to reduction of a number of the components, although the insert molding of the base 27 becomes slightly complex. Still furthermore, since the hooking clasp 22 can be mounted on the base 27 only with press-fitting the hooking clasp 22 into the base 27, the body 26, that is, the connector 21 can be built up extremely easily.

Subsequently, a modified example of the card connector in accordance with the second embodiment of the present invention is described. The stationary hooking portion 20 in the above first embodiment and the stationary hooking members 28 in the second embodiment are formed of the metal plate, however, in this modified example, a stationary hooking portion is formed of a synthetic resin integrally with a body. A connector 21' in accordance with the modified example is shown in FIGS. 10A to 10C and FIGS. 11A to 11C.

Figure 10A:
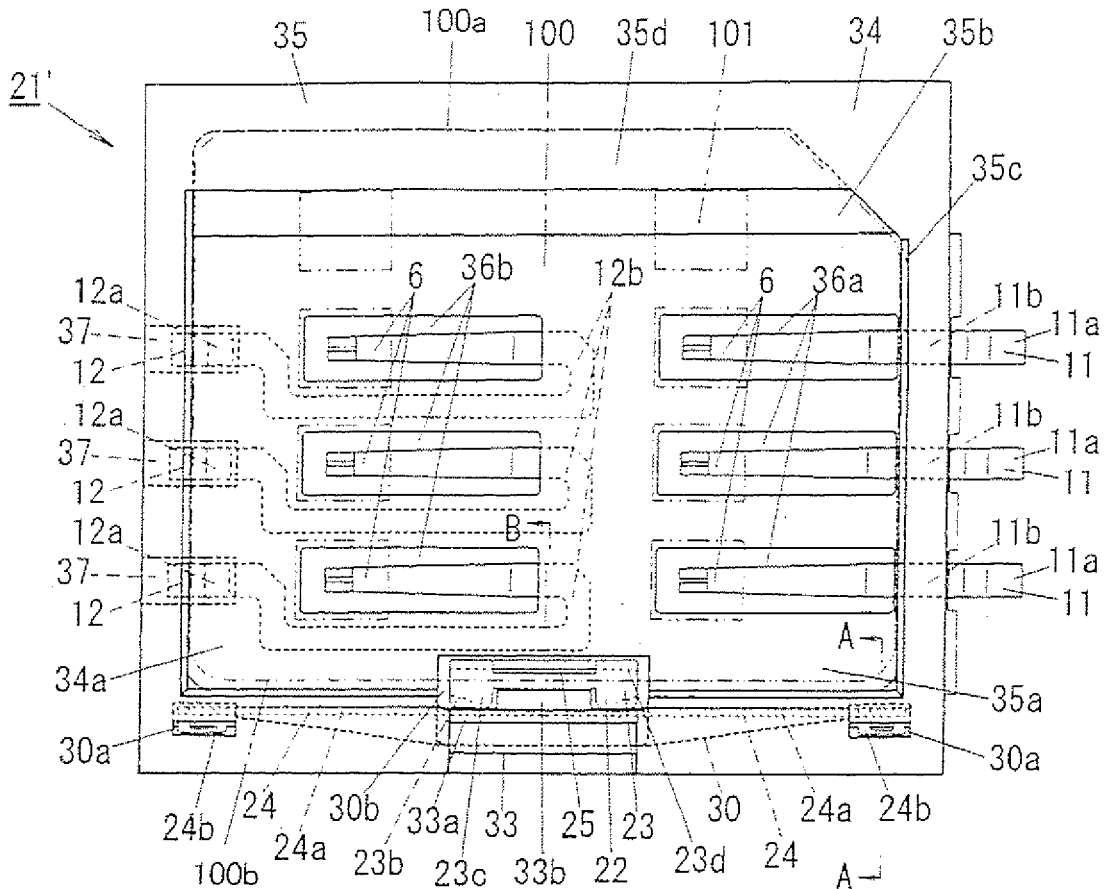
FIG. 10A is a plain view showing a constitution of a modified example of the connector in accordance with the second embodiment.

As shown in FIG. 10A, a base 35 has a substantially rectangular parallelepiped box shape, which is formed of a synthetic resin with insert molding, and in which a recess 34a for the IC card 100 is formed at a substantially center portion thereof. Furthermore, three first terminal members 11 and the three second terminal members 12 are integrally provided on the base 35.

The recess 34a of the base 35 has a shape almost the same as the outer shape of the IC card 100, but is formed slightly larger in size. As shown in FIG. 10A, a rectangular opening 35b which is longer in a longitudinal direction and also penetrates through a front face to a rear face of the base 35 is formed on a rear face side of a bottom face 35a of the recess 34a. A clearance for rotating the vicinity of the front end 100a of the IC card 100 when putting the IC card 100 into the recess 34a is retained with this opening 35b.

Three rectangular through holes 36a which are longer in the longitudinal direction are formed in parallel with an anteroposterior direction, and slightly nearer to a right side in relation to a center of the bottom face 35a of the recess 34a of the base 35. Similarly, three rectangular through holes 36b which are longer in the longitudinal direction are formed in parallel with the anteroposterior direction, and slightly nearer to a left side in relation to the center of the bottom face 35a of the recess 34a. The contact springs 6 are respectively disposed to allow for elastic deformation in the through holes 36a and 36b. Furthermore, grooves 37 of rectangular shape arranged in parallel with the respective through holes 36b in the longitudinal direction are formed on a left side of a rear face of the base 35.

Figure 11A:
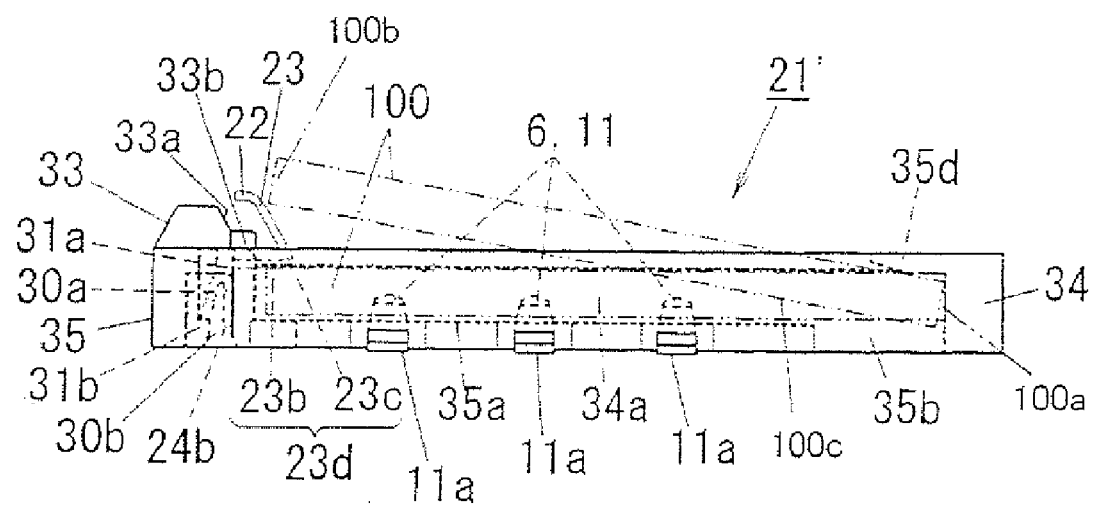
FIG. 11A is a right side view showing a constitution of the modified example of the connector in accordance with the second embodiment described above.

As shown in FIG. 10A, tapered faces 35c inclined toward the bottom face 35a are formed on end portions of an opening of the recess 34a in both sides in the longitudinal direction and a front face side of the base 35. This tapered faces 35c serve as leading guides when putting the IC card 100 into the recess 34a. Furthermore, a stationary hooking portion 35d is formed of a synthetic resin integrally with the base 35 from an inner face of the recess 34a in the rear face side of the base 35 so as to project toward a front face substantially in parallel with the bottom face 35a of the recess 34a. As shown in FIG. 11A, a tapered face is formed on a lower end portion of a front face of the stationary hooking portion 35d so that the front end 100a of the IC card 100 can easily be inserted between the stationary hooking portion 35d and the bottom face 35a of the recess 34a.

Figure 10B:
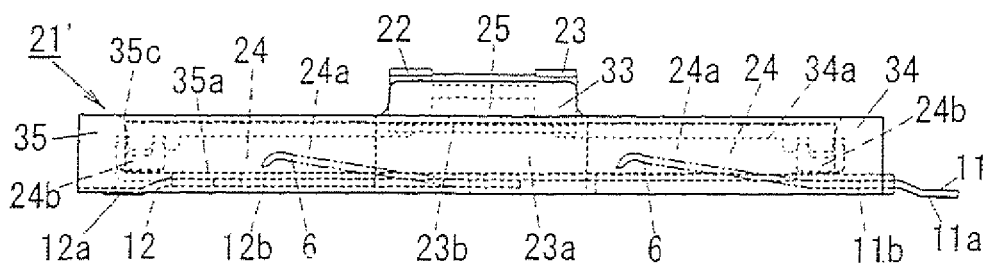
FIG. 10B is a front view of the connector.
Figure 10C:
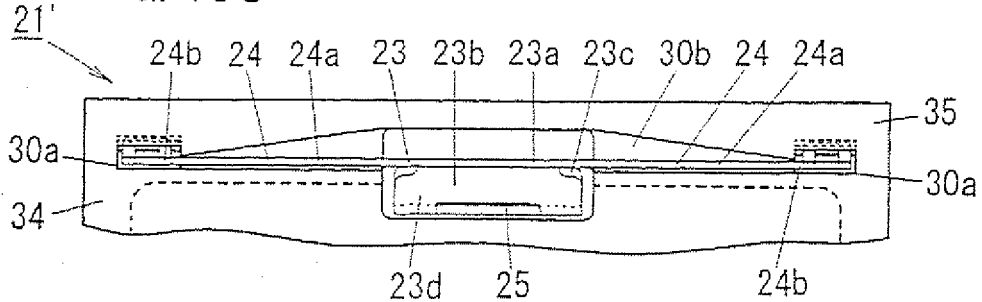
FIG. 10C is a bottom view in which a portion of the connector is omitted.
Figure 11B:
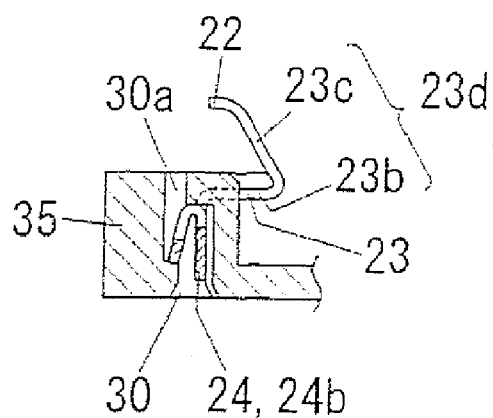
FIG. 11B is a partial cross-sectional view along a line A-A in FIG. 10A.
Figure 11C:
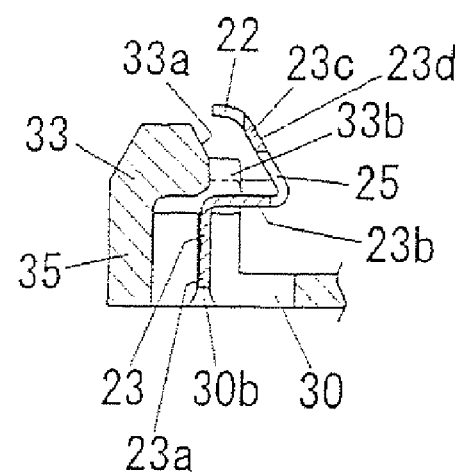
FIG. 11C is a partial cross-sectional view along a line B-B in FIG. 10A.

As shown in FIGS. 10C, 11A, and 11B, the mounting hole 30 through which the hooking clasp 22 is mounted on the base 35 is formed in a lower portion of the front face side of the base 35. Furthermore, the protrusion 33 described above is integrally formed in an upper portion of the front face side of the base 35.

As for the first terminal members 11 and the second terminal members 12, as shown in FIG. 10A, each first terminal members 11 is held on a molding die so as to project the contact spring 6 from the right side face of the through hole 36a to the left side, and also, to project the terminal 11a from the right side face of the base 35 to the right side. Furthermore, each second terminal members 12 is held on the molding die so as to project the contact spring 6 from an inner right face of the through hole 36b to the left side, and also, to project the terminal 12a from an inner right face of the groove 37 corresponds to the through hole 36b to the left side. With inpouring an insulation synthetic resin into the molding die in such a state, the base 35 is molded, and the first terminal members 11 and the second terminal members 12 are integrally held with the base 35, simultaneously.

In respective of the contact springs 6 of the first terminal members 11 and the second terminal members 12 comprised on the base 35 by this means, as shown in FIGS. 10B and 11A respectively, front end portions of them are placed above the bottom face 35a of the recess 34a, and also, disposed inside the corresponding through holes 36a and 36b swingablly in a heightwise direction.

Subsequently, an operation of the connector 21' when putting the IC card 100 into the connector 21' is described.

Firstly, as shown in FIG. 11A, the front end 100a of the IC card 100 is inserted between the stationary hooking portion 35d and the bottom face 35a of the recess 34a with directing the front end 100a of the IC card 100 downward. Secondly, the rear end 100b of the IC card 100 is pressed downward. As described above, the tapered faces 35c formed on the base 35 serve as leading guides when putting the IC card 100 into the recess 34a. Furthermore, since the opening 35b is formed on the rear face side of the bottom face 35a of the recess 34a, a clearance for rotating the vicinity of the front end 100a of the IC card 100 when putting the IC card 100 into the recess 34a is retained with the opening 35b. Thus, when the rear end 100b of the IC card 100 is pressed downward, the vicinity of the front end 100a of the IC card 100 can be smoothly rotated in this clearance, so that it is possible to prevent that rotation or movement of the IC card 100 is interrupted due to the front end 100a of the IC card 100 contacts with the bottom face 35a of the recess 34a. Still furthermore, an insertion angle of the front end 100a of the IC card 100 between the stationary hooking portion 35d and the bottom face 35a of the recess 34a can widely be taken up. Consequently, the IC card 100 can be put into the recess 34a easily. Still furthermore, since the clearance for rotating the vicinity of the front end 100a of the IC card 100 can be enlarged with forming the opening 35b in the rear face side of the bottom face 35a of the recess 34a, it is possible to enlarge a size of a projection of the stationary hooking portion 35d toward the front face side. Consequently, when putting the IC card 100 into the connector 21', the IC card 100 can firmly be held in the recess 34a of the base 35.

When pressing the IC card 100 in, then a lower end of the rear end 100b of the IC card 100 will contact with the inclined side 23c of the movable hooking member 23. After contacting the rear end 100b of the IC card 100 with the inclined side 23c of the movable hooking member 23, when the rear end 100b of the IC card 100 is further pressed downward, the rear end 100b of the IC card 100 is relatively slid downward along the inclined side 23c of the movable hooking member 23. The movable hooking member 23 is moved toward the front side of the connector 21 with the external force pressing the IC card 100 in against the charging force of the plate spring 24.

When the rear end 100b of the IC card 100 reaches the vicinity of the lower end of the inclined side 23c of the movable hooking member 23, the contact terminals 101 placed nearest to the front end side of the IC card 100 among the eight contact terminals 101 disposed to be exposed from the bottom face 100c of the IC card 100 are exposed on the rear face side of the base 35 from the opening 35b formed on the bottom face 35a of the recess 34b, and the remained six contact terminals 101 contact with the contact springs 6 projecting to the upper side from the bottom face 35a of the recess 34a of the base 35.

When the rear end 100b of the IC card 100 is further pressed downward against the charging force of the plate spring 24 and the elasticity of the contact springs 6, the rear end 100b of the IC card 100 departs from the lower end of the inclined side 23c of the movable hooking member 23, and then, it is placed below the hooking portion 23b. The movable hooking member 23 moves toward the rear face of the connector 21' with the charging force of the plate spring 24, and the hooking portion 23c moves to a position overlapping with the surface of the vicinity of the rear end 100b of the IC card 100 in the heightwise direction of the connector 21'. Consequently, the IC card 100 is contained in the recess 34a of the base 35, and then, put in the connector 21'.

Although the IC card 100 contained in the recess 34a of the base 35 is tried to be floated from the bottom face 35a of the recess 34a with the charging force of the respective contact springs 6, its movement in the heightwise direction of the connector 21' is blocked with the bottom face 35a of the recess 34a, the stationary hooking member 35d and the hooking portion 23b of the movable hooking member 23. Consequently, the IC card 100 is firmly put into the recess 34a without floating from the bottom face 35a of the recess 34a.

In order to detach the IC card 100 from the connector 1 (SIC), the IC card 100 is lifted above the connector 21' with the elastic force of the contact springs 6 with moving the movable hooking member 23 toward the front face side of the connector 21' against the charging force of the plate spring 24 and releasing the holding condition of the rear end 100b of the IC card 100 between the hooking portion 23b of the movable hooking member 23 and the bottom face 35a of the recess 34a. When a force applied to the movable hooking member 23 is released in such a state, the movable hooking member 23 returns to an initial position with the charging force of the plate spring 24, the rear end of the hooking portion 23b goes in below the bottom face 100c of the IC card 100, and the rear end 100b of the IC card 100 contacts with the inclined side 23c. Consequently, the IC card 100 can easily be detached from the connector 1 (SIC).

As described above, an effect similar to that of the connector 21 described above can be obtained also with the connector 21' in accordance with the modified example of the second embodiment. Furthermore, since the stationary hooking portion 35d is integrally formed of the synthetic resin with the body 34, a production cost can be kept lower, although a mechanical intensity is slightly lower in comparison with a connector that a stationary hooking portion or a stationary hooking member is formed of a metal plate.

Besides, the card connector in accordance with the present invention is not limited to a connector comprising six contact springs as described in the respective embodiments described above. Furthermore, the IC card to be used is not also limited to the mini-UICC, however, an IC card generally used or a SIM card can be used. Still furthermore, it goes without saying that the shape of the card connector can also be formed in a suitable shape according to the shape of an IC card to be used.

Furthermore, the card connector in accordance with the present invention is not limited to the description of the respective embodiments described above. It, however, is sufficient to comprise: a body comprising a recess into which a card, having a plurality of contact terminals disposed to be exposed on a surface thereof, is put; a plurality of contact springs projecting from a bottom face of the recess and contacting with respective contact terminals of a card elastically; a stationary hooking portion provided on a first face (for example, a rear face) side of the body and holding a first end portion (for example, a front end) of the card with the bottom face of the recess; a movable hooking member provided on a second face (for example, a front face) side of the body, having a hooking portion on a side thereof facing the first face of the body, and being movable in a direction (for example, an anteroposterior direction) connecting the first face to the second face of the body; and a charging member for charging the movable hooking member toward the first face side of the body so as to hold a second end portion (for example, a rear end) of the card between the hooking portion of the movable hooking member and the bottom face of the recess; and wherein a face of the hooking portion facing the first face of the body is formed on a tapered face which comes closer to the first face side of the body as approaching to the bottom face of the recess.

Thereby, the card can be attached to the connector with containing the card into the recess by means of the stationary hooking portion and the movable hooking member provided on the body, so that it is no need to provide any additional cover or card holder, and thereby, a compact card connector having a simple structure can be obtained. Furthermore, attaching and detaching workings of the card are performed with the movement of the movable hooking member of the body in a direction connecting the first dace and the second face, so that the attaching and detaching workings of the card can be performed easily.

In addition to the constitution described above, it may be constituted that: the body is comprised of a base made of a synthetic resin and a metallic shell which is to be put on an outer face of the base; the base comprises the contact springs integrated with insert molding, and the movable hooking member is mounted slidably in the direction connecting the first face and the second face of the body; the shell has a stopper which contacts with the first end portion of the card and positions the card in the recess; and the stationary hooking portion is formed to project integrally from the stopper to the second face side of the body. Thereby, it is possible to reduce a number of components, to simplify the constitution of and also to downsize the connector furthermore. Furthermore, since the stopper for positioning the card is comprised, the working for attaching the card can be made much easier.

Furthermore, the charging member may be a plate spring formed to be integral with the shell. Alternatively, it may be constituted that the movable hooking member and the charging member may be integrally formed of a metal material having elasticity and are mounted on the body at a front end of the charging member. Thereby, the number of components can be reduced much more, and thereby, the constitution of the connector can be made much simpler.

Still furthermore, it may be constituted that the body comprises the contact springs and the stationary hooking portion integrated with insert molding. Thereby, the connector can be comprised of only two components, that is, the movable hooking member comprising the charging member integrally, and the body, so that a connector having a much simpler structure and is inexpensive can be obtained.

Still furthermore, it may be constituted that: a mounting hole used for attaching the movable hooking member and the charging member to the body is formed on the second face side of the body; and the mounting hole comprises a first hole portion into which the base end of the charging member is press-fitted and a second hole portion which communicates with the first hole portion and into which the movable hooking member and a remained portion of the charging member are inserted so that they can move in the direction (an anteroposterior direction) connecting the first face and the second face of the body. According to such a constitution, the movable hooking member comprising the charging member integrally can be attached to the body with a one-touch operation, so that assemble of the connector can be performed much easier.

Still furthermore, a leading guide when inserting the card into the recess may be provided on an end portion of an opening of the recess. Thereby, when putting the card into the connector, the card is guided to the recess of the connector with the leading guide, so that attachment of the card can be made easier.

Still furthermore, a clearance for rotating a vicinity of the first end portion (front end) of the card when putting into the card may be provided on the bottom face of the recess on the first face (rear face) side of the body. Thereby, when inserting the card into the recess, the first end portion (front end) of the card can be rotated with using this clearance, so that the movement of the card may not be interrupted due to the first end of the card contacts the bottom face of the recess. Consequently, the attachment of the card to the connector becomes easier.

The present application is based on Japanese Patent Application No. 2004-238742, and the content of it should be incorporated with the present invention accordingly, with reference to the specification and the drawings of the patent application described above.

Furthermore, the present invention is sufficiently described by the embodiments referring to the appended drawings, however, it is obvious to a person who has a conventional knowledge in this field that various modifications or deformations are possible. Thus, such modifications or deformations should be interpreted to be within the scope of the present invention, not extending beyond it.

The invention claimed is:

1. A card connector, comprising:
a body comprising: a base, a shell coupled to the base, the shell having a stopper provided at a first side-face of the body, and a recess configured to receive a card having a plurality of contact terminals exposed on a surface of the card, wherein at least a portion of the base defines a bottom face of the recess;
a plurality of contact springs projecting from the bottom face of the recess, the plurality of contact springs being configured to elastically contact corresponding contact terminals of the card;
a stationary hook provided at the first side-face of the body, the stationary hook being configured to retain a first end portion of the card between the stationary hook and the bottom face of the recess;
a movable hook provided at a second side-face of the body, the movable hook having a hooking portion which opposes the first side-face of the body, the movable hook being configured to move in a direction extending generally perpendicular to the first side-face and the second side-face;

a charging member configured to urge the movable hook toward the first side-face of the body so as to retain a second end portion of the card between the hooking portion of the movable hook and the bottom face of the recess, wherein a face of the hooking portion facing the first side-face of the body comprises a tapered face which extends farther towards the first side-face of the body as the tapered face approaches the bottom face of the recess; and wherein a predetermined clearance is provided between a side-face of the base and the stopper of the shell.

2. The card connector in accordance with claim 1, wherein the base comprises a synthetic resin and the shell comprises a metallic material, the shell being coupled to an outer face of the base;

the base and the plurality of contact springs being insertion molded so as to be formed integral with each other, and the movable hook is configured to slide in the direction extending generally perpendicular to the first side-face and second side-face;

the stopper contacting the first end portion of the card so as to position the card within the recess; and the stationary hook projecting integrally from the stopper towards the second side-face of the body.

3. The card connector in accordance with claim 2, wherein the charging member comprises a plate spring formed integral with the shell.

4. The card connector in accordance with claim 1, wherein the movable hook and the charging member are formed integrally with each other and comprise an elastic metal material, the movable hook being mounted on the body at a front end of the charging member.

5. The card connector in accordance with claim 4, wherein the body comprises the plurality of contact springs and the stationary hooking portion formed integrally by insertion molding.

6. The card connector in accordance with claim 4, further comprising a mounting hole configured to attach the movable hook and the charging member to the body, the mounting hole being provided on the second side-face of the body; and the mounting hole comprising a first hole portion into which a base end of the charging member is press-fitted and a second hole portion which communicates with the first hole portion, the movable hook and a portion of the charging member being inserted into the second hole portion so as to be configured to move in the direction extending generally perpendicular to the first side-face and the second-side face.

7. The card connector in accordance with claim 1, further comprising a leading guide, when inserting the card into the recess, provided on an end portion of an opening of the recess.

8. The card connector in accordance with claim 1, wherein the predetermined clearance is configured to allow rotation of the first end portion of the card when inserting the card into the recess.

9. The card connector in accordance with claim 5, wherein a mounting hole configured to attach the movable hook and the charging member to the body, the mounting hole being provided on the second side-face of the body; and the mounting hole comprising a first hole portion into which a base end of the charging member is press-fitted and a second hole portion which communicates with the first hole portion, the movable hook and a and a portion of the charging member being inserted into the second hole portion so as to be configured to move in the direction extending generally perpendicular to the first side-face and the second-side face.

10. The card connector in accordance with claim 1, wherein the predetermined clearance is provided at a rear side of the side-face of the base.

11. The card connector in accordance with claim 1, wherein the predetermined clearance defines an opening provided in the base of the body.

12. The card connector in accordance with claim 10, wherein the predetermined clearance defines an opening provided in the base of the body.

* * * * *